US012609734B2

(12) United States Patent
Elshafie et al.

(10) Patent No.: US 12,609,734 B2
(45) Date of Patent: Apr. 21, 2026

(54) CODEBOOK GENERATION FOR PRECODING RECONFIGURABLE INTELLIGENT SURFACE (RIS) ELEMENTS

(71) Applicant: QUALCOMM Incorporated, San Diego, CA (US)

(72) Inventors: Ahmed Elshafie, San Diego, CA (US); Yu Zhang, San Diego, CA (US); Krishna Kiran Mukkavilli, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 18/256,028

(22) PCT Filed: Mar. 1, 2021

(86) PCT No.: PCT/CN2021/078402
§ 371 (c)(1),
(2) Date: Jun. 5, 2023

(87) PCT Pub. No.: WO2022/183310
PCT Pub. Date: Sep. 9, 2022

(65) Prior Publication Data
US 2024/0048188 A1 Feb. 8, 2024

(51) Int. Cl.
*H04B 7/04* (2017.01)
*H04B 7/0456* (2017.01)

(52) U.S. Cl.
CPC ....... *H04B 7/04026* (2023.05); *H04B 7/0456* (2013.01)

(58) Field of Classification Search
CPC ............ H04B 7/04013; H04B 7/04026; H04B 7/0456
See application file for complete search history.

(56) References Cited

U.S. PATENT DOCUMENTS

2023/0007522 A1* 1/2023 Yang ................... H04W 56/001
2023/0176174 A1* 6/2023 Penna ..................... H01Q 3/46
342/451

FOREIGN PATENT DOCUMENTS

CN 111181618 A 5/2020
CN 111245493 A 6/2020
(Continued)

OTHER PUBLICATIONS

International Search Report and Written Opinion—PCT/CN2021/078402—ISA/EPO—Nov. 25, 2021.
(Continued)

*Primary Examiner* — Timothy X Pham
(74) *Attorney, Agent, or Firm* — QUALCOMM Incorporated

(57) ABSTRACT

Aspects of the present disclosure relate to techniques, methods, devices, systems, and non-transitory computer readable medium for generating codebooks for reconfigurable intelligent surfaces (RIS) s. For example, a RIS controller generates a codebook for a RIS by computing weights using a discrete Fourier transform (DFT) function or a fractional Fourier transform (FrFT) function, based on reference signals (RSs) transmitted by a transmitter. The weights correspond to the RIS elements or a subset of the RIS elements. In some aspects, the computation of the weights may include oversampling factors that allow for a higher resolution of the weights and improved search for an optimal precoding setting. Different sets of weights may be used for different incoming beams. The RIS controller may be trained with a pair of transmitter and a receiver to identify/generate the codebook for an optimized set of weights under specific situations.

28 Claims, 12 Drawing Sheets

(56)                 References Cited

FOREIGN PATENT DOCUMENTS

| | | | |
|---|---|---|---|
| CN | 112350759 | A | 2/2021 |
| WO | 2020254030 | A1 | 12/2020 |
| WO | 2020254031 | A1 | 12/2020 |

OTHER PUBLICATIONS

Jung M., et al., "On the Optimality of Reconfigurable Intelligent Surfaces (RISs): Passive Beamforming, Modulation, and Resource Allocation", IEEE Transactions on Wireless Communications, IEEE Service Center, Piscataway, NJ, US, vol. 20, No. 7, Feb. 18, 2021, pp. 4347-4363, XP011865418, Section III, figure 1.
Supplementary European Search Report—EP21928401—Search Authority—The Hague—Oct. 14, 2024.
Wymeersch H., et al., "Radio Localization and Mapping with Reconfigurable Intelligent Surfaces", arXiv:1912.09401v2 [eess. SP], Cornell University Library, 201 Olin Library Cornell University Ithaca, NY 14853, pp. 1-9, Jun. 11, 2020, XP081681498, pp. 6,7.

\* cited by examiner

300

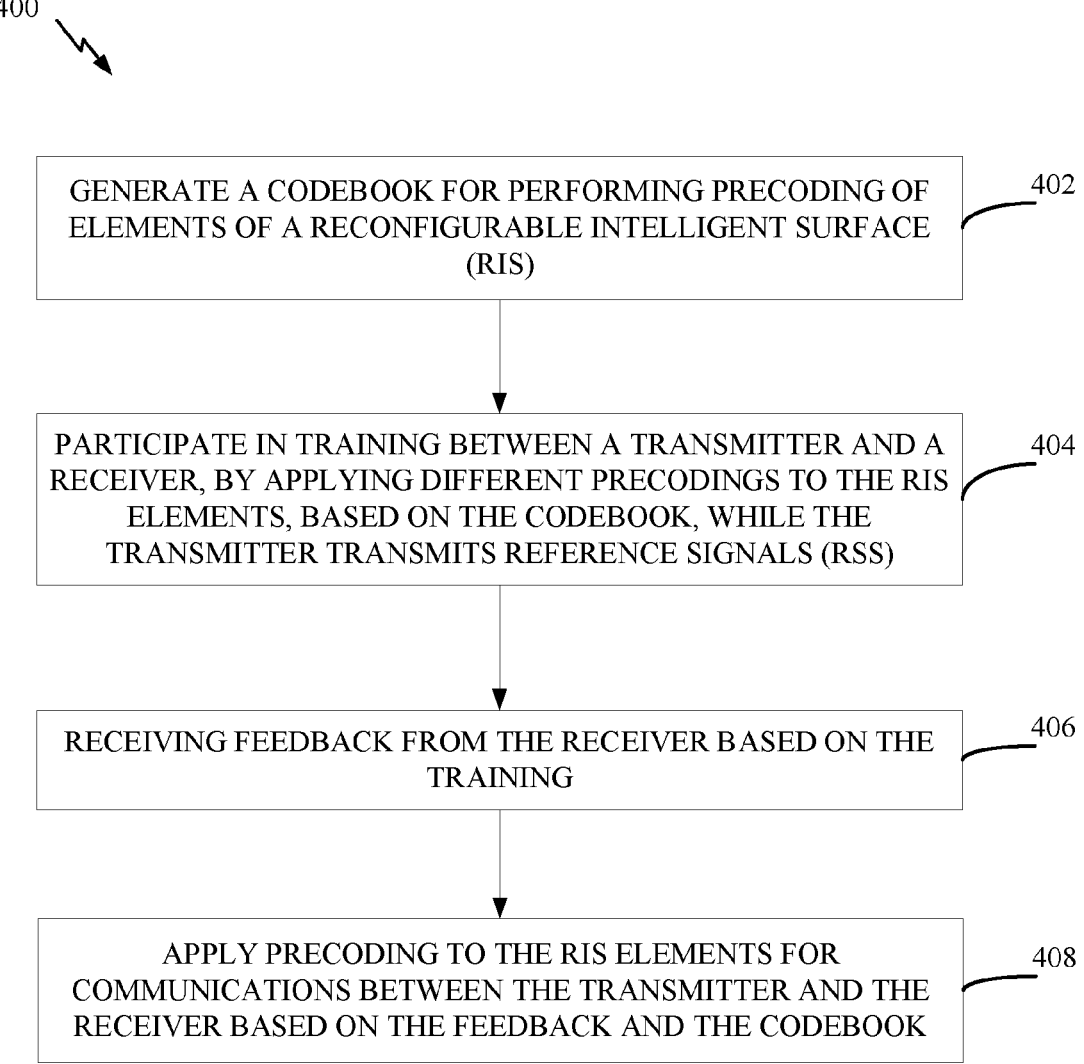

400

GENERATE A CODEBOOK FOR PERFORMING PRECODING OF ELEMENTS OF A RECONFIGURABLE INTELLIGENT SURFACE (RIS) — 402

PARTICIPATE IN TRAINING BETWEEN A TRANSMITTER AND A RECEIVER, BY APPLYING DIFFERENT PRECODINGS TO THE RIS ELEMENTS, BASED ON THE CODEBOOK, WHILE THE TRANSMITTER TRANSMITS REFERENCE SIGNALS (RSS) — 404

RECEIVING FEEDBACK FROM THE RECEIVER BASED ON THE TRAINING — 406

APPLY PRECODING TO THE RIS ELEMENTS FOR COMMUNICATIONS BETWEEN THE TRANSMITTER AND THE RECEIVER BASED ON THE FEEDBACK AND THE CODEBOOK — 408

FIG. 4

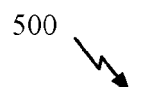

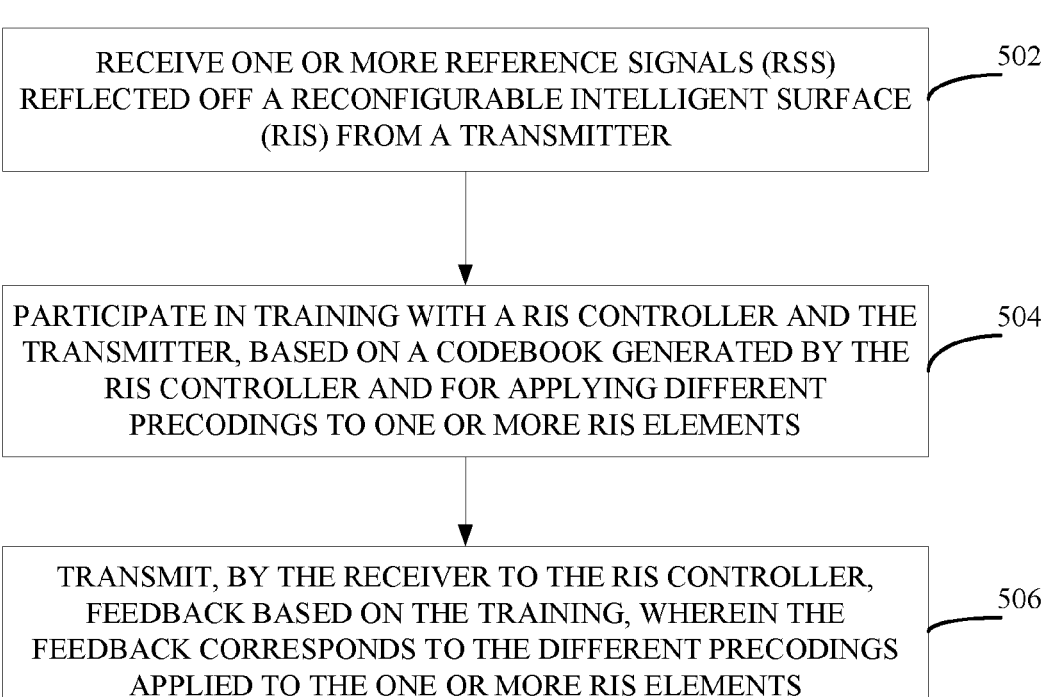

RECEIVE ONE OR MORE REFERENCE SIGNALS (RSS) REFLECTED OFF A RECONFIGURABLE INTELLIGENT SURFACE (RIS) FROM A TRANSMITTER — 502

PARTICIPATE IN TRAINING WITH A RIS CONTROLLER AND THE TRANSMITTER, BASED ON A CODEBOOK GENERATED BY THE RIS CONTROLLER AND FOR APPLYING DIFFERENT PRECODINGS TO ONE OR MORE RIS ELEMENTS — 504

TRANSMIT, BY THE RECEIVER TO THE RIS CONTROLLER, FEEDBACK BASED ON THE TRAINING, WHEREIN THE FEEDBACK CORRESPONDS TO THE DIFFERENT PRECODINGS APPLIED TO THE ONE OR MORE RIS ELEMENTS — 506

| Received Metric 1 | Precoding Setting 1 | Reference Signal 1 |
|---|---|---|
| Received Metric 2 | Precoding Setting 2 | Reference Signal 2 |
| Received Metric 3 | Precoding Setting 3 | Reference Signal 3 |
| Received Metric 4 | Precoding Setting 4 | Reference Signal 4 |
| ⋮ | ⋮ | ⋮ |
| Received Metric k-1 | Precoding Setting k-1 | Reference Signal k-1 |
| Received Metric k | Precoding Setting k | Reference Signal k |

700

1100

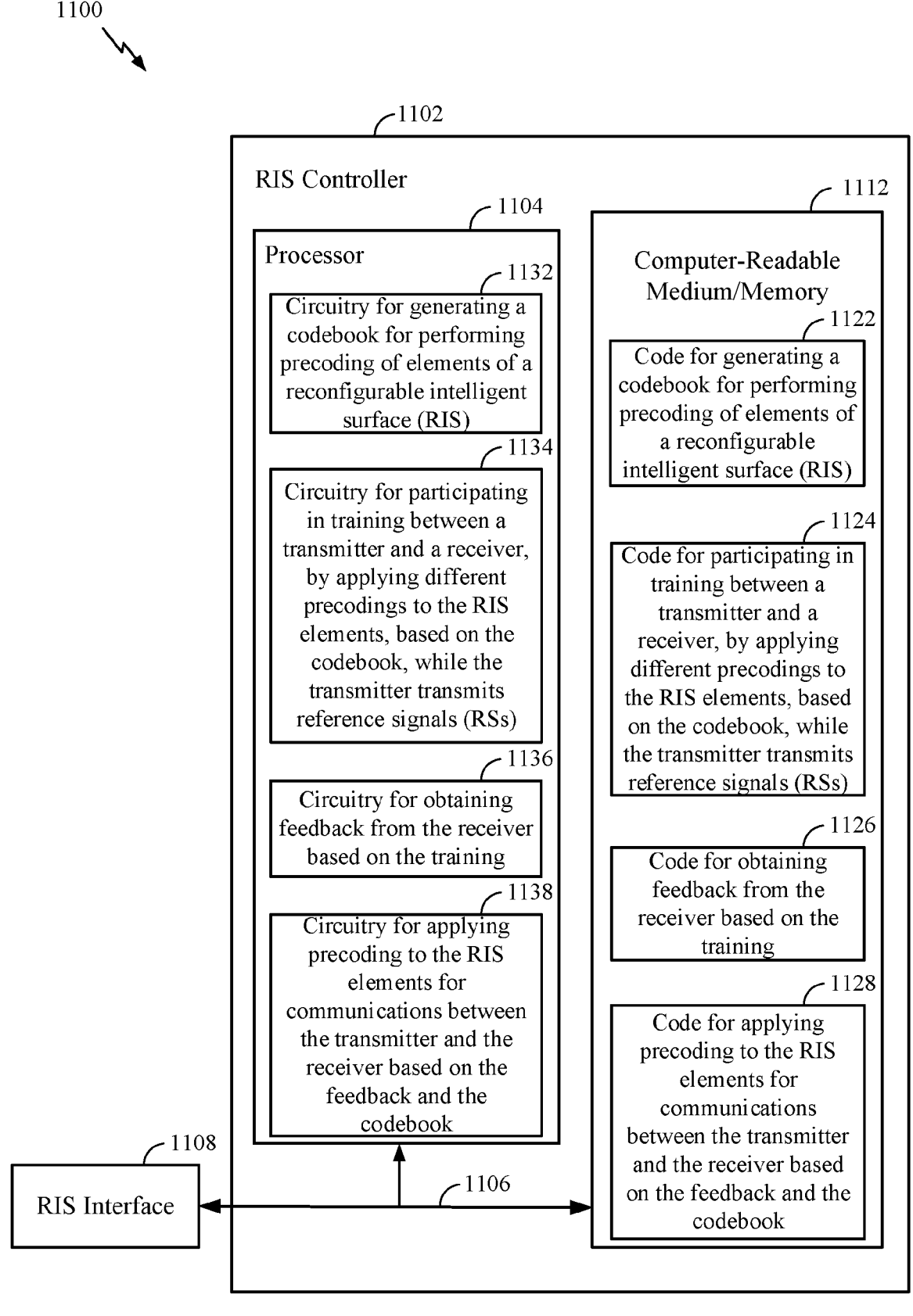

1102

RIS Controller

1104

Processor

1132

Circuitry for generating a codebook for performing precoding of elements of a reconfigurable intelligent surface (RIS)

1134

Circuitry for participating in training between a transmitter and a receiver, by applying different precodings to the RIS elements, based on the codebook, while the transmitter transmits reference signals (RSs)

1136

Circuitry for obtaining feedback from the receiver based on the training

1138

Circuitry for applying precoding to the RIS elements for communications between the transmitter and the receiver based on the feedback and the codebook

1112

Computer-Readable Medium/Memory

1122

Code for generating a codebook for performing precoding of elements of a reconfigurable intelligent surface (RIS)

1124

Code for participating in training between a transmitter and a receiver, by applying different precodings to the RIS elements, based on the codebook, while the transmitter transmits reference signals (RSs)

1126

Code for obtaining feedback from the receiver based on the training

1128

Code for applying precoding to the RIS elements for communications between the transmitter and the receiver based on the feedback and the codebook

1108

RIS Interface

CODEBOOK GENERATION FOR PRECODING RECONFIGURABLE INTELLIGENT SURFACE (RIS) ELEMENTS

CROSS-REFERENCE TO RELATED APPLICATIONS

This application is a national stage application under 35 U.S.C. 371 of PCT/CN2021/078402 filed Mar. 1, 2021, which is hereby expressly incorporated by reference herein in its entirety as if fully set forth below and for all applicable purposes.

INTRODUCTION

Aspects of the present disclosure relate to wireless communications, and more particularly, to controlling reconfigurable intelligent surface (RIS) elements.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access-points and stations in a wireless network.

Certain aspects provide a method for wireless communications by a controller. The method generally includes generating a codebook for performing precoding of elements of a reconfigurable intelligent surface (RIS); participating in training between a transmitter and a receiver, by applying different precodings to the RIS elements, based on the codebook, while the transmitter transmits reference signals (RSs); receiving feedback from the receiver based on the training; and applying precoding to the RIS elements for communications between the transmitter and the receiver based on the feedback and the codebook.

Certain aspects provide a method for wireless communications by a device. The method generally includes receiving one or more reference signals (RSs) reflected off a reconfigurable intelligent surface (RIS) from a transmitter; participating in training with a RIS controller and the transmitter, based on a codebook generated by the RIS controller and for applying different precodings to one or more RIS elements; and transmitting, to the RIS controller, feedback based on the training, wherein the feedback corresponds to the different precodings applied to the one or more RIS elements.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 4 is a flow diagram illustrating example operations by a RIS controller for generating a codebook for precoding RIS elements, in accordance with certain aspects of the present disclosure.

FIG. 5 is a flow diagram illustrating example operations by a receiver in training with a RIS controller and a transmitter, in accordance with certain aspects of the present disclosure.

FIG. 11 illustrates a communications device that may include various components configured to perform operations for the techniques disclosed herein.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
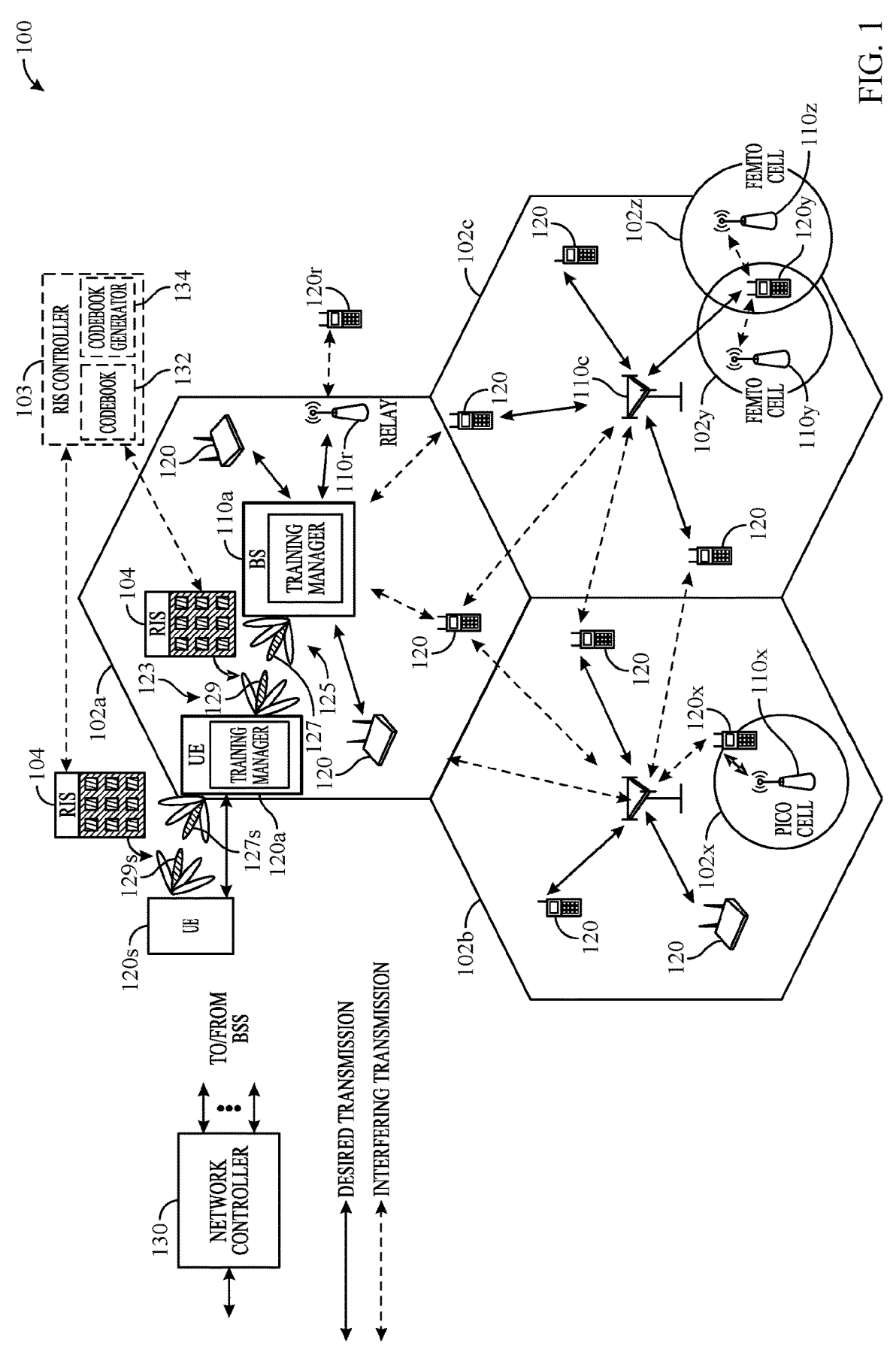
FIG. 1 is a block diagram conceptually illustrating an example telecommunications system, including a reconfigurable intelligent surface (RIS), in accordance with certain aspects of the present disclosure.

Aspects of the present disclosure provide apparatus, methods, processing systems, and computer readable mediums for generating a codebook for performing precoding of elements of a reconfigurable intelligent surface (RIS). A RIS usually includes an array of metamaterial that may interact with radio signals by tuning the impedance variations over the surface. For example, a RIS controller may configure and reconfigure at least one RIS element (e.g., a small antenna that reflects radio waves with a configurable time delay or phase shift). According to the present disclosure, the RIS controller participates in training, with and between a transmitter and a receiver, by applying different precodings to the RIS elements based on the codebook, while the transmitter transmits reference signals (RSs). The RIS controller receives feedback from the receiver based on the training and applies precoding to the RIS elements for communications between the transmitter and the receiver based on the feedback and the codebook.

At a high level, a RIS includes a number of elements, which form a surface that may be integrated into different objects such as walls, sidings, cloths, etc. The RIS elements are reconfigurable scatterers, including antennas that receive and re-radiate (e.g., reflect or refract) radio wave signals. The RIS elements may be passive, such that no external power is required for the re-radiation, and such that the re-radiation is configurable with a phase shift for each RIS element. The RIS element may also be active, such that the re-radiation may change the amplitude in addition to the phase shift. The RIS elements may therefore perform constructive interference that resembles beamforming and re-radiate beams in certain directions from a transmitter (e.g., a UE) toward a receiver (e.g., a BS). Such beamforming or precoding of the RIS elements is controlled by identifying each phase shift values, or weights, to be applied to each RIS element given specific conditions of the transmitter and the receiver. The present disclosure provides techniques for generating a codebook at the RIS controller for applying the codebook-based precoding weights to the RIS elements in order to provide an efficient or optimized re-radiation.

For example, the RIS controller generates a codebook by computing weights using a discrete Fourier transform (DFT) function or a fractional Fourier transform (FrFT) function, based on reference signals (RSs) transmitted by a transmitter. The weights correspond to the RIS elements or a subset of the RIS elements. In some aspects, the computation of the weights may include oversampling factors that allow for a higher resolution of the weights and improved search for an optimal precoding setting. Different sets of weights may be used for different incoming beams. The RIS controller may be trained with a pair of transmitter and a receiver to identify/generate the codebook for an optimized set of weights under specific situations. The transmitter and the receiver may respectively be a UE and a gNB in a Uu link, or a UE and a monitoring Ue in a sidelink (PC5 interface). Details of generating the weights and the training procedures with a transmitter-receiver pair are presented below.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. As shown in FIG. 1, a user equipment (UE), such as the UE 120 (e.g., including the UEs 120a and 120s) in the wireless communication network 100 communicates with a serving base station (BS), such as the BS 110a in a cell 102a in the wireless communication network 100. The UE 120 may be configured with multiple transmission configurations (e.g., antenna arrays/panels and/or beams) for uplink transmission to the BS 110a. In some cases, the UE 120 may be configured with multiple transmission configurations for sidelink transmission to a UE 120s.

Figure 2:
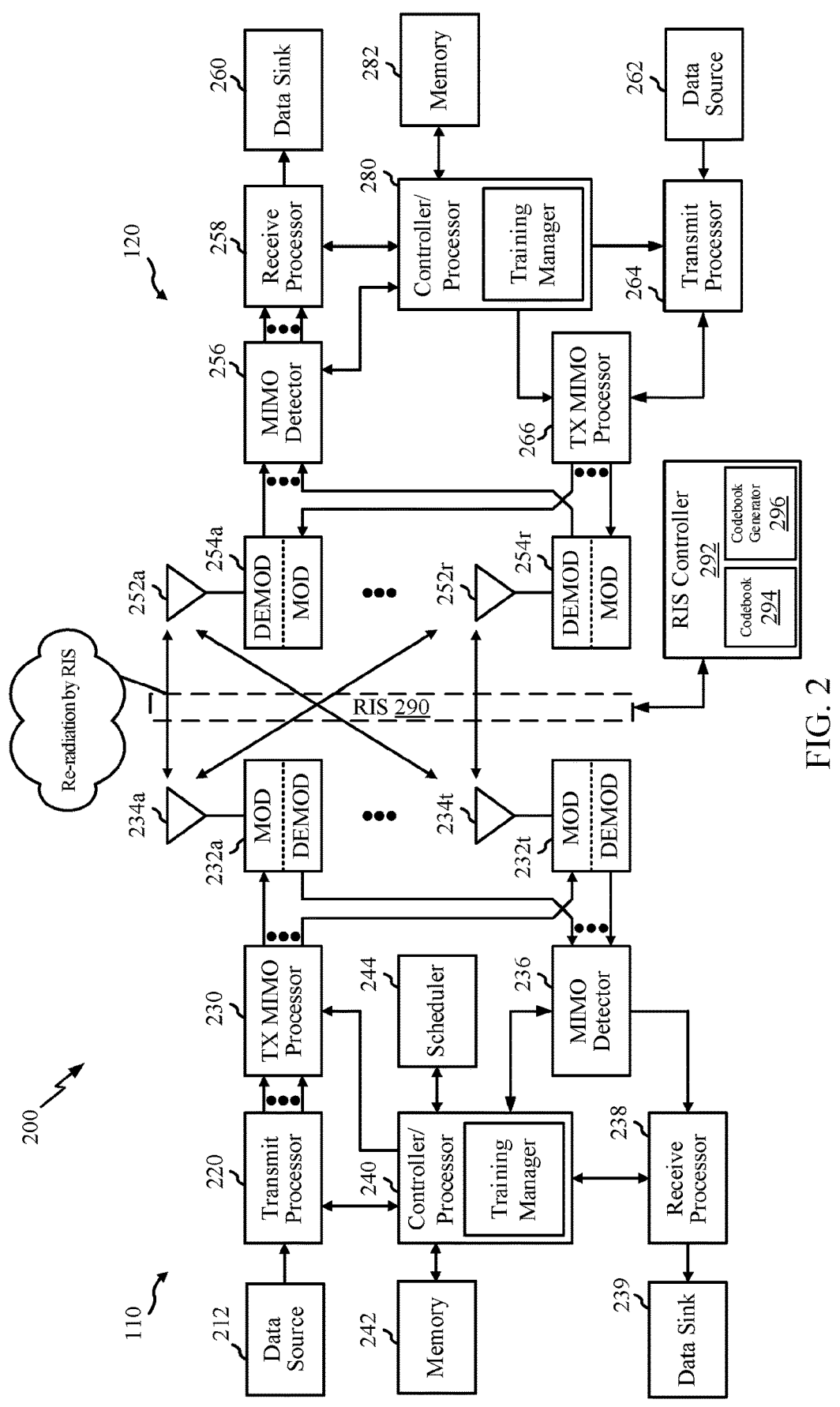
FIG. 2 is a block diagram conceptually illustrating a design of an example base station (BS) and user equipment (UE), aided by a RIS, in accordance with certain aspects of the present disclosure.

In certain aspects, the BS 110a (e.g., gNB) and the UE 120a may be blocked by obstacles and require assistance from a reconfigurable intelligent surface (RIS) 104 (also shown in FIGS. 2 and 3). The RIS 104 enables the BS 110a and UE 120a to circumvent the blocking obstacles by receiving and re-radiating radio signals. For example, the RIS 104 may generate a codebook for precoding one or more elements thereon (referred to as RIS elements) to allow a beam from one of the BS 110a and UE 120a (e.g., a transmitter) to be re-radiated off the RIS to reach the other one of the BS 110a and UE 120a (e.g., a receiver). The direction of the re-radiation by the RIS 104 may be controlled or reconfigured by the RIS controller 103. The RIS controller 103 includes a codebook 132 and a codebook generator 134 for generating the codebook 132. The codebook 132 includes values of weights to modify the radio signal re-radiated by each RIS element, such as weight shifting or changing amplitudes. The codebook generator 134 may generate different codebooks when provided different conditions.

In an example, when the UE 120 is the transmitter and communicates with the BS 110a (e.g., Uu interface), the BS 110a is the receiver that provides the RIS controller 103 feedback for identifying a favorable beam direction. Similarly, when the UE 120a establishes a sidelink (e.g., PC5 interface) with the UE 120s, the UE 120a may be the transmitter and the UE 120s may be the receiver that provides the RIS controller 103 feedback. The codebook 132 may be generated based on specific settings of the BS 110a and the UE 120a, and based on different parameters specific to situations. The present disclosure provides techniques for generating or designing the codebook 132.

The feedback from the receiver to the RIS controller 103 allows for the training of a favorable beam configuration between the transmitter and the receiver. For example, the UE 120a may send a series of reference signals (RSs) in different directions 129. Via the re-radiation (e.g., reflection or refraction) by the RIS, the BS 110a receives the RSs. The re-radiation by the RIS is controlled by a RIS controller that may apply different weights to the RIS elements, causing different phase shifts, and therefore different beamforming characteristics for the RSs to reach the BS 110a. The BS 110a may evaluate the RSs using one or more metrics, such as a signal strength, an energy level, a signal to noise ratio (SNR), a channel quality indicator (CQI), or a reference signal received power (RSRP).

The BS 110a may use one of the metrics as feedback to inform the RIS controller which set of weights may be preferred and training the RIS controller of the preferred settings. Similarly, the BS 110a may be a transmitter and send RSs in different directions 127 for the UE 120a to receive. When training with a RIS controller in sidelink situations, the UE 120s may be a transmitter and send RSs in different directions 129s; and the UE 120a may be a transmitter and send RSs in different directions 127s. Other configurations in system 100 can be similarly setup between the UEs 120 and BSs 110.

As illustrated in FIG. 1, the wireless communication network 100 may include a number of BSs 110 and other network entities. ABS may be a station that communicates with UEs. Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120a, 120s, 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node such as a UE or a BS may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

FIG. 2 illustrates example components of BS 110 and UE 120 (as depicted in FIG. 1), which may be used to implement aspects of the present disclosure. As shown, the RIS 290 may assist the communications, by receiving and re-radiate radio signals, between the BS 110 and UE 120 when such communications are impeded or blocked by obstacles (not shown, illustrated as the blockage in FIGS. 3A and 3B). For example, the RIS 290 may re-radiate the transmissions from one of the BS 110 or UE 120 to the other using reflection, refraction, or other passive or active mechanisms.

The RIS 290 may be reconfigured or controlled by a RIS controller 292. Each RIS element may re-radiate radio signals with certain phase or amplitude changes, such as phase shifts. The RIS controller 292 may reconfigure the phase or amplitude changes by applying a precoding weight to each RIS element to enable the RIS 290 to re-radiate an output beam at different directions given a particular input beam. An illustrative deployment example of the RIS 290 is shown in FIG. 3B. According to the present disclosure, the RIS controller 292 includes a codebook generator 296 and a codebook 294. The codebook generator 296 may generate codebooks 294 specific to incoming reference signals, such as the reference signals transmitted by a transmitter (either the BS 110 or the UE 120). The generated codebooks 294 may be stored in the RIS controller 292 for future use in conditions similar to when the codebooks 294 are generated.

The antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. Although the present disclosure uses RIS as an example of implementing the precoding techniques, the techniques may apply to another form of cooperative communications, such as transparent relaying or regenerative relaying implementations. As shown in FIG. 2, the controller/processor 280 has a training manager that may perform codebook training with a RIS controller 292 configured to adjust weights on the RIS elements, as described in more detail herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the base station 110.

At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The processor 240 and/or other processors and modules at the BS 110 may perform or direct the execution of processes for the techniques described herein. For example, as shown in FIG. 2, the processor 240 has a training manager that may perform codebook training with a RIS controller 292 configured to adjust weights on the RIS elements, as described in more detail herein. The memories 242 and 282 may store data and program codes for BS 110 and UE 120, respectively. A scheduler 244 may schedule UEs for data transmission on the downlink and/or uplink.

Example Application and Precoding of Reconfigurable Intelligent Surface (RIS)

As discussed above, massive multiple input multiple output (MIMO) configuration increases throughput. For example, MIMO can achieve high beamforming gain by using active antenna units and can operate with individual radio frequency (RF) chains for each antenna port. To further such advantages and extend coverage, RISs may be deployed to reflect impinging waves in desired directions. In some cases, RISs may operate without substantial power consumption when they operate passively to only reflect or refract beams from the transmitter toward the receiver. In some cases, the reflection or refraction direction may be controlled by gNB or a monitoring sidelink UE.

Figure 3A:
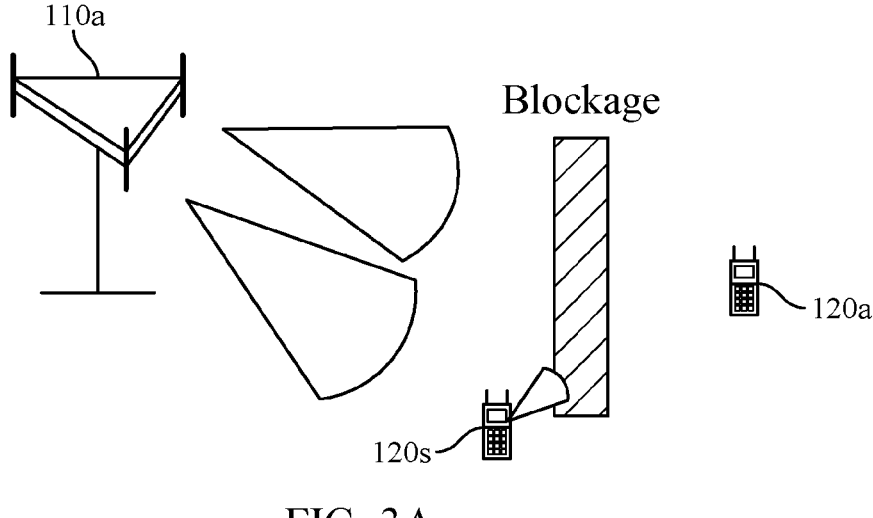
FIG. 3A illustrates an example of communication blockage between wireless communication devices.
Figure 3B:
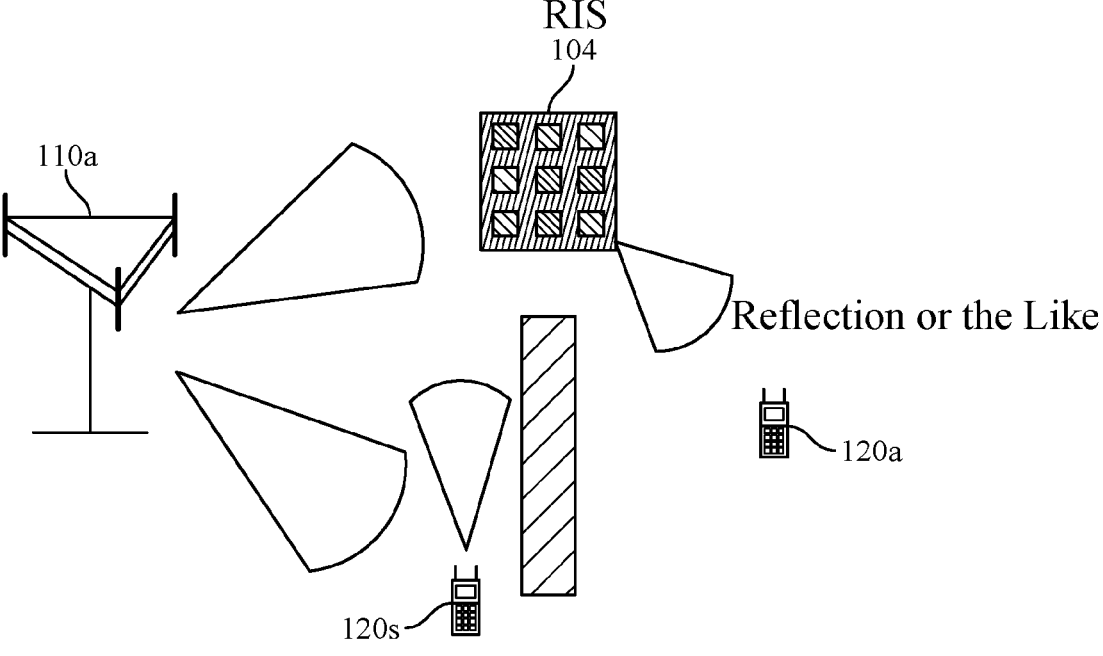
FIG. 3B illustrates an example of using a RIS to overcome impediment by obstacles between a BS and a UE, according with certain aspects of the present disclosure.

FIG. 3A illustrates an example of communication blockage between wireless communication devices. As shown, impeded by a blockage, a first network entity (BS 110*a*) may only transmit to the UE 120*s* and may not reach the UE 120*a*, as the blockage preventing signals from reaching the UE 120*a*. The blockage also prevents the UE 120*s* from establishing sidelink communications with the UE 120*a*. As such, the UE 120*a* may not communicate with the BS 110*a* via the UE 120*s* using sidelink.

FIG. 3B illustrates an example of using a RIS (such as the RIS 290 of FIG. 2) to overcome the blockage, according with certain aspects of the present disclosure. As shown, a RIS is introduce to reflect or otherwise re-radiate the radio signals to bypass the blockage. For example, the two-way communications between the BS 110*a* and the UE 120*a* are enabled by the RIS re-radiating one or more beams from the BS 110*a* toward UE 120*a* and vice versa. Furthermore, the RIS can also be reconfigured (i.e., directing incoming and outgoing beams at different angles) to enable the UEs 120*s* and 120*a* to establish sidelink communications.

The RIS may perform passive beamforming. For example, the RIS may receive signal power from the transmitter (e.g., the BS 110*a*, UE 120*a*, or UE 120*s*) proportional to the number of RIS elements thereon. When the RIS reflects or refracts the radio signal, the RIS elements cause phase shifts to perform conventional beamforming or precoding. The phase shifts are controlled by precoding weights (e.g., a multiplier or an offset of time delay) applied to the RIS elements. For an array of RIS elements, such as an m×n rectangular matrix, for example, a respective precoding weight may be generated or specified for each of the RIS element by the RIS controller. The present disclosure provides different techniques for generating and applying the weights, such that an optimal setting or configuration of the RIS for a specific transmitter and receiver pair may be identified and applied. This process of identifying the optimal setting may be referred to as training, which may be a closed-loop operation performed in real-time, on demand, and/or when the pair of transmitter and receiver changes with respect to the RIS (e.g., movement or changes of the current pair, or a new transmitter or receiver joining the pair).

Before implementing the disclosed techniques, channel acquisition or beam training via the RIS can be challenging, because a RIS generally does not inherently have transceiver chains or sensing abilities to use conventional channel estimation methods. In addition, introducing the RIS to a pair of transmitter or receiver that can already communicate with each other but for the blockage can increase the number of channel coefficients proportional to the number of the RIS elements, causing potentially large overhead. The present disclosure provides techniques for designing codebooks to enable precoding of the RIS elements to at least overcome these existing challenges, along with bringing other advantages as mentioned above.

Example Codebook Design for Codebook-Based RIS Elements Precoding

The present disclosure provides techniques for designing a codebook for precoding RIS elements based on specific beam conditions of the beam transmitter and receiver pair. The transmitter and receiver pair may include a UE and a BS, or two sidelink UEs. The transmitter may transmit references signals during the training procedures. The receiver may, using one or more metrics, evaluate the received reference signals re-radiated and precoded by the RIS. The receiver may provide feedback to the RIS controller to identify the best settings of the RIS available for providing the most reliable and robust signals.

In a general aspect, a controller may generate a codebook for performing precoding of elements of a RIS. The controller may participate in training between a transmitter and a receiver, by applying different precodings to the RIS elements, based on the codebook, while the transmitter transmits reference signals (RSs). The RSs that would have been blocked are re-radiated by the RIS elements to reach the receiver. The precoding of the RIS elements controls the direction of the re-radiated RSs toward the receiver. For example, applying different precodings causes at least one of a phase shift or an amplitude change to one or more of the RIS elements when the RIS re-radiates the RSs. The controller receives feedback from the receiver based on the training. The precoding applied to the RIS elements for communications between the transmitter and the receiver are based on the feedback and the codebook generated by the controller.

FIG. 4 is a flow diagram illustrating example operations 400 for wireless communication, in accordance with certain aspects of the present disclosure. The operations 400 may be performed by a RIS controller, such as the RIS controller 103 of FIG. 1 or the RIS controller 292 of FIG. 2. Although the RIS controller 103 or 292 is illustrated as a separate and independent device, in some cases, the RIS controller 103 or 292 may be integrated with each RIS. In some cases, the UE 120 or the BS 110 may perform operations 400 as a RIS controller (e.g., when the UE 120 or the BS 110 includes an internal RIS controller module).

Operations 400 may be implemented as software components that are executed and run on one or more processors (e.g., codebook generator 296 of FIG. 2). Further, the transmission and reception of signals by a transmitter or a receiver (e.g., one of the BS 110 or UE 120 in FIG. 2) in operations 200 may be enabled, for example, by one or more antennas (e.g., antennas 234 and 252 of FIG. 2). In certain aspects, the transmission and/or reception of signals by the transmitter or receiver may be implemented via a bus interface of one or more processors (e.g., controller/processor 240 or 280) obtaining and/or outputting signals.

The operations 400 begin, at 402, with the RIS controller generating a codebook for performing precoding of RIS elements. For example, in some aspects, the codebook may be generated by computing discrete Fourier transform (DFT)

weights corresponding to at least a subset of the RIS elements. In some aspects, the codebook may be generated by computing fractional Fourier transform (FrFT) weights, corresponding to at least a subset of the RIS elements.

At 404, the RIS controller participates in training between a transmitter and a receiver, by applying different precodings to the RIS elements, based on the codebook, while the transmitter transmits reference signals (RSs). In some aspects, applying different precodings to the RIS elements causes at least one of a phase shift or an amplitude change to one or more of the RIS elements when the RIS reflects the RSs. For example, before completing the training, the transmitter may routinely transmit RSs, which are re-radiated off the RIS elements after being precoded toward the receiver.

At 406, the RIS controller receives feedback from the receiver based on the training. For example, the feedback may include an indication of results of the training. In some cases, the indication may be an index corresponding to one of the RSs. The index may be a metric such as a signal strength, an energy level, a signal to noise ratio (SNR), a channel quality indicator (CQI), or a reference signal received power (RSRP).

At 408, the RIS controller applies precoding to the RIS elements for communications between the transmitter and the receiver based on the feedback and the codebook. For example, upon training, the RIS controller applies an identified set of weights that provide an optimal metric given the relative positions of the transmitter, the RIS, and the receiver. The transmitter and the receiver may then have data communication via the RIS. The RIS may be reconfigured (e.g., start another training procedure) when events occur and warrant another training, such as when the transmitter or the receiver has moved to another location, uses a different antenna, or when a new transmitter or receiver joins and replaces one of the existing transmitter or receiver.

FIG. 5 is a flow diagram illustrating example operations 500 for wireless communication, in accordance with certain aspects of the present disclosure. The operations 500 may be performed by a receiver (e.g., a base station or a UE), such as the base station 110 or the UE 120. For example, in FIG. 3B, the receiver may be the BS 110*a* or the UE 120*s* when the UE 120*a* is the transmitter.

Operations 500 may be implemented as software components that are executed and run on one or more processors (e.g., controller/processor 240 or 280 of FIG. 2). Further, the transmission and reception of signals by the BS in operations 800 may be enabled, for example, by one or more antennas (e.g., antennas 234 or 238 of FIG. 2). In certain aspects, the transmission and/or reception of signals by the BS or UE may be implemented via a bus interface of one or more processors (e.g., controller/processor 240 or 280) obtaining and/or outputting signals.

The operations 500 of the receiver begin, at 502, by receiving one or more RSs reflected off a RIS from a transmitter. For example, the transmitter may send multiple beams of RSs. The RIS re-radiates the beams that are received by the receiver.

At 504, the receiver participates in training with a RIS controller and the transmitter, based on a codebook generated by the RIS controller and for applying different precodings to one or more RIS elements.

At 506, the receiver transmits to the RIS controller, feedback based on the training, wherein the feedback corresponds to the different precodings applied to the one or more RIS elements.

Figures 6A, 6B:
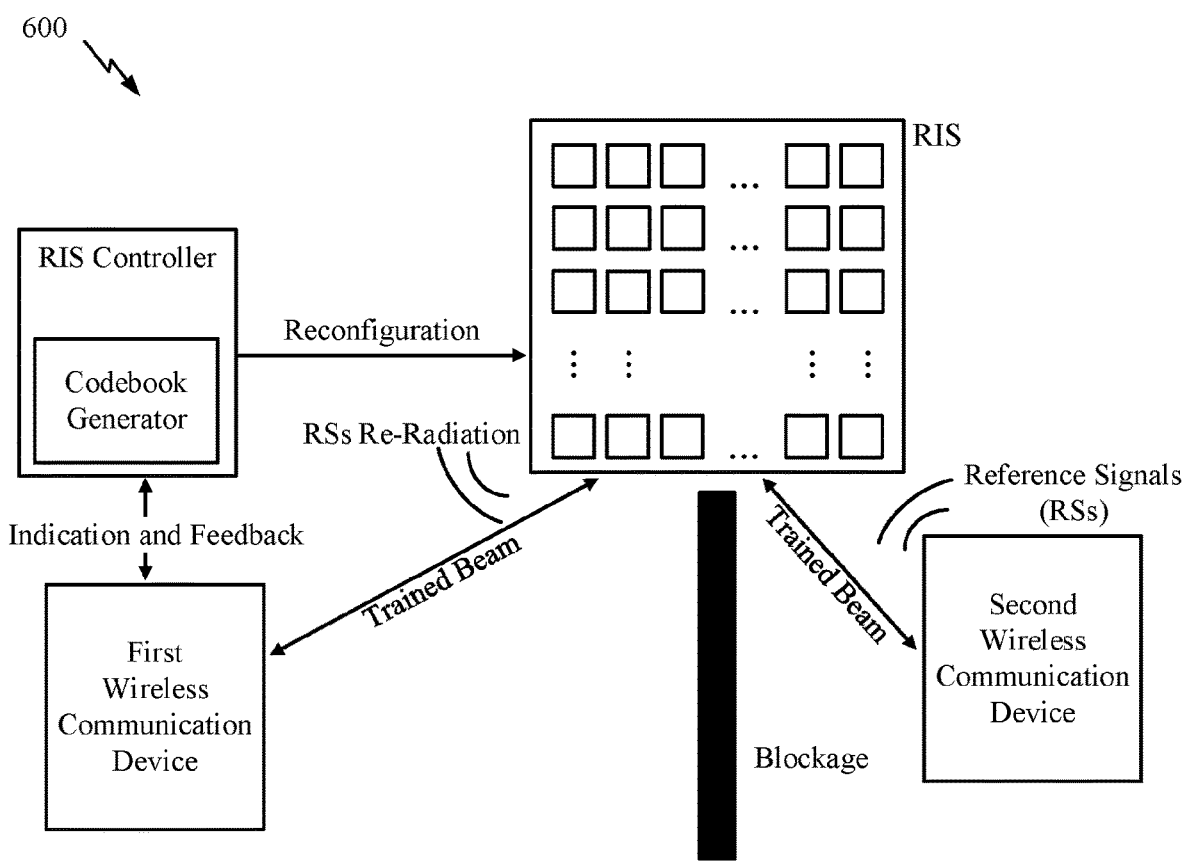
FIGS. 6A and 6B illustrate an example training operation for precoding RIS elements, in accordance with certain aspects of the present disclosure.

Details of operations 400 and 500 are further illustrated in FIGS. 6A and 6B, which illustrate an example training operation 600 for precoding RIS elements. As shown in FIG. 6A, a first wireless communication device may be blocked by the blockage from communicating directly with a second wireless communication device. The first and the second wireless communication devices may be a base station and a UE, or two UEs supporting sidelink communications. In the example shown, the second wireless communication device transmits reference signals (RSs) to the RIS. The RIS re-radiates, in a different beam direction, the RSs to the first wireless communication device.

As shown in FIG. 6B, multiple (same or different) precoding settings may be applied to the RIS with respect to the sequence of RSs. Correspondingly, the first wireless communication device may measure a receiving metric corresponding to each of the re-radiated RSs. As illustrated, for 1 through k RSs, the received metrics may be used to identify one precoding setting that generates an optimal value. The training process completes when the optimal value is identified for the pair of the first and second wireless communication devices with respect to the RIS.

In some aspects, the first wireless communication device and the second wireless communication device (e.g., the UE and gNB) may agree on a sequence of indices of DFT (or precoding settings) to be used, based on one the generation of DFT weights previously proposed and/or trained, so that at a reference signal j (sent at a certain time within a series of times) may be associated with the sequence of indices of weights. As such, the RIS controller knows the corresponding DFT weights and can correctly use or apply the DFT weights.

Figure 7:
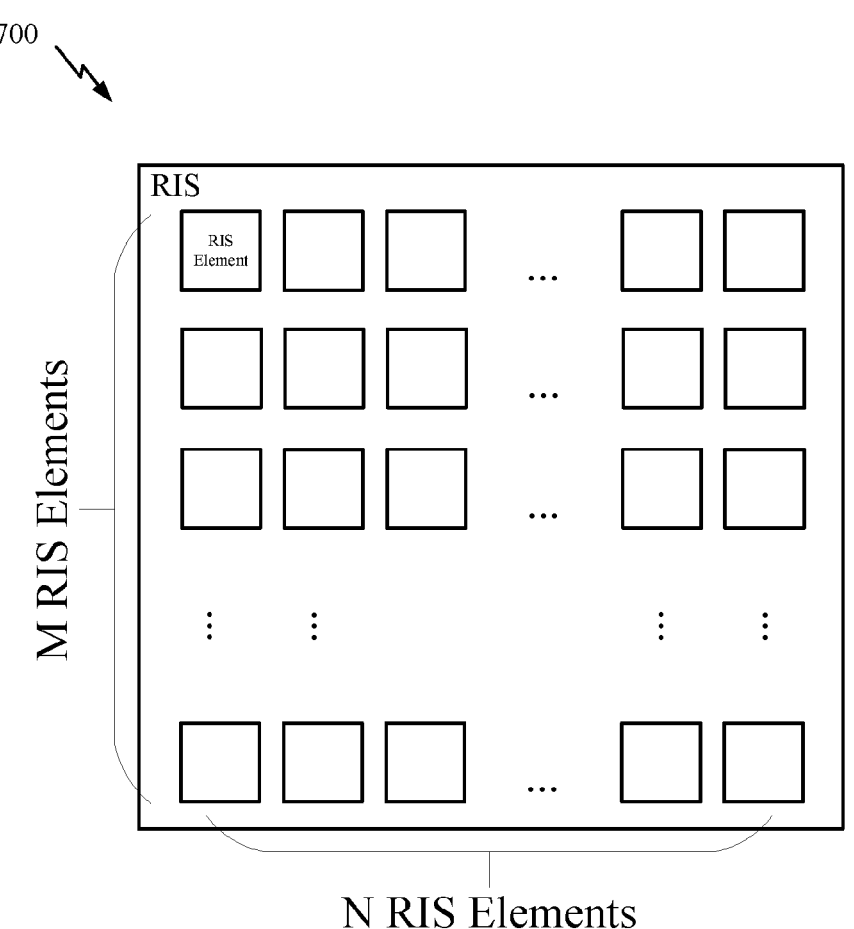
FIG. 7 illustrates an example arrangement of RIS elements, in accordance with certain aspects of the present disclosure.

An example of a RIS of an array of N×M RIS elements is shown in FIG. 7. The RIS controller may reconfigure the RIS by applying different precoding weights to the RIS elements (or at least a subset thereof), such that the beam direction of re-radiation may be altered. In one example, the RIS controller may generate a DFT matrix of size N×M, where N is the number of horizontal elements and M is the number of vertical elements. Although FIG. 7 illustrates the RIS as a rectangular array, the disclosed precoding techniques herein are applicable to RIS of various element layouts or patterns.

Considering both FIGS. 6A and 7, the RIS controller includes a codebook generator that generates a codebook for determining the weight values (or weights) for the RIS elements. For example, the codebook generator may generate the codebook by computing discrete Fourier transform (DFT) weights corresponding to at least a subset of the RIS elements. For example, the DFT weights may be computed based on (such as a corresponding sequence of complex numbers transformed from) the sequence of RSs from the transmitter. In other words, the RIS controller may use DFT weights to have the RIS spread the beam across the RIS elements.

In some aspects, computing the DFT weights include computing a Kronecker product of a first vector to be used across the MRIS elements in the vertical domain and a second vector to be used across the N RIS element in the horizontal domain. For example, a first DFT vector is used across all vertical RIS elements to obtain an N by N DFT matrix. A second DFT vector is used across all horizontal RIS elements to obtain an M by M DFT matrix. The product of the two DFT vectors results in a matrix of M by N, corresponding to the array of the RIS elements.

In some aspects, computing the DFT weights include generating a single DFT vector with a size of M·N from a DFT matrix of size MN by MN.

In some aspects, computing the DFT weights include generating M DFT vectors from an N by N DFT matrix.

Figure 8:
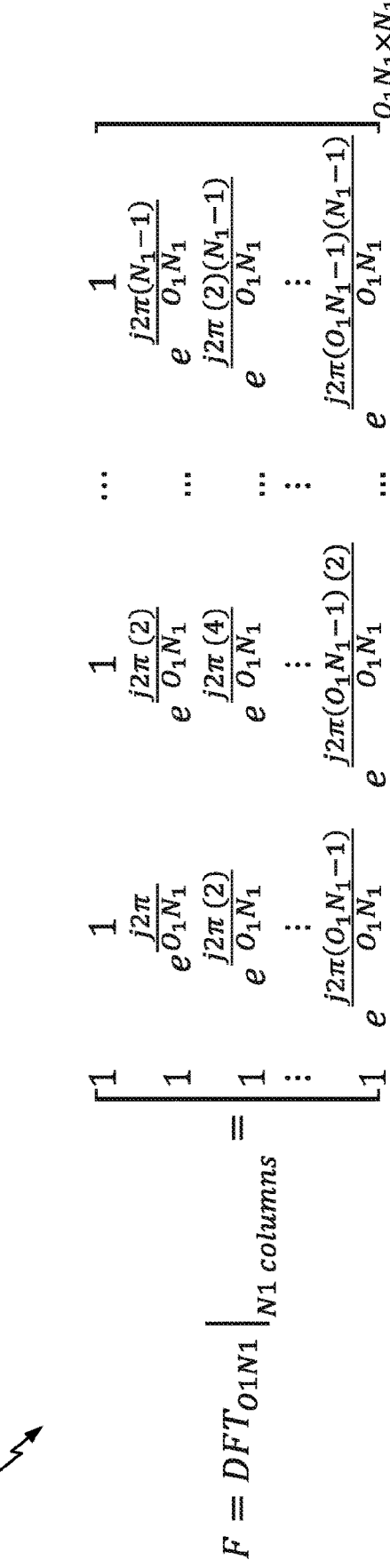
FIG. 8 illustrates an example generation of high-resolution weights for precoding RIS elements, in accordance with certain aspects of the present disclosure.

FIG. 8 illustrates an example generation 800 of high-resolution weights for precoding RIS elements, in accordance with certain aspects of the present disclosure. By applying an oversampling factor (e.g., $O_1$, $O_2$, etc.), the RIS controller can generate a higher resolution of the weights and allow the receiving wireless communication device to better search for the optimal reception metric to identify the corresponding precoding settings. The RIS controller may receive, from at least one of the transmitter or receiver, an indication of the oversampling factor. In some examples, the first wireless communication device (e.g., a BS) may share the oversampling factors to the RIS or the RIS controller. When oversampling weights are generated, a subset of the oversampled codebook may be used. For example, the first wireless communication device may signal a part of the codebook to use. As shown in FIG. 8, after applying the oversampling factor $O_1$, the oversampled DFT matrix grows from $N_1$ by $N_1$ to $O_1N_1$ by $O_1N_1$, and is truncated by removing the columns from $N_1+1$ to $O_1N_1$.

In certain aspects, the oversampling factor O1 may be used for horizontal RIS elements, and the oversampling factor O2 may be used for vertical RIS elements. The oversampling factors may be an integer greater than 1. Assuming the number of time-frequency resources is $N_1=N\cdot M$, the oversampling factor O indicates a number of DFT vectors as a repetition having O interval sets. For example, when O=4, a first set having orthogonal codebook includes the number of resources 0, 4, 8, 12, . . . A second set having orthogonal codebook includes 1, 5, 9, 13, . . . A third set having orthogonal codebook includes 2, 6, 10, 14, . . . And a fourth set having orthogonal codebook includes 3, 7, 11, 15, . . . When the first wireless communication device wants orthogonal beam across time, the first wireless communication device may signal the index of the set of orthogonal beams to be used, such as, for example, via RRC, MAC CE, or DCI.

In some aspects, computing the oversampled DFT weights may include receiving signaling from at least one of the transmitter or receiver when orthogonal beams across time are used. A portion of the oversampled codebook may be selected based on the signaling received.

In some aspects, generating the DFT matrix of oversampled weights include applying the oversampling factor to each dimension of the DFT matrix of M by N weights generated based on the Kronecker product, when computing the DFT weights comprises computing a Kronecker product of a first vector to be used across the RIS elements in the vertical domain and a second vector to be used across the RIS elements in the horizontal domain.

In some aspects, generating the DFT matrix of oversampled weights include applying the oversampling factor to the single DFT vector of the size of M·N, when computing the DFT weights comprises generating a single DFT vector with a size of M·N from a DFT matrix of size MN by MN.

In some aspects, generating the DFT matrix of oversampled weights include applying the oversampling factor to generate the M DFT vectors when computing the DFT weights comprises generating M DFT vectors from an N by N DFT matrix.

Figure 9:
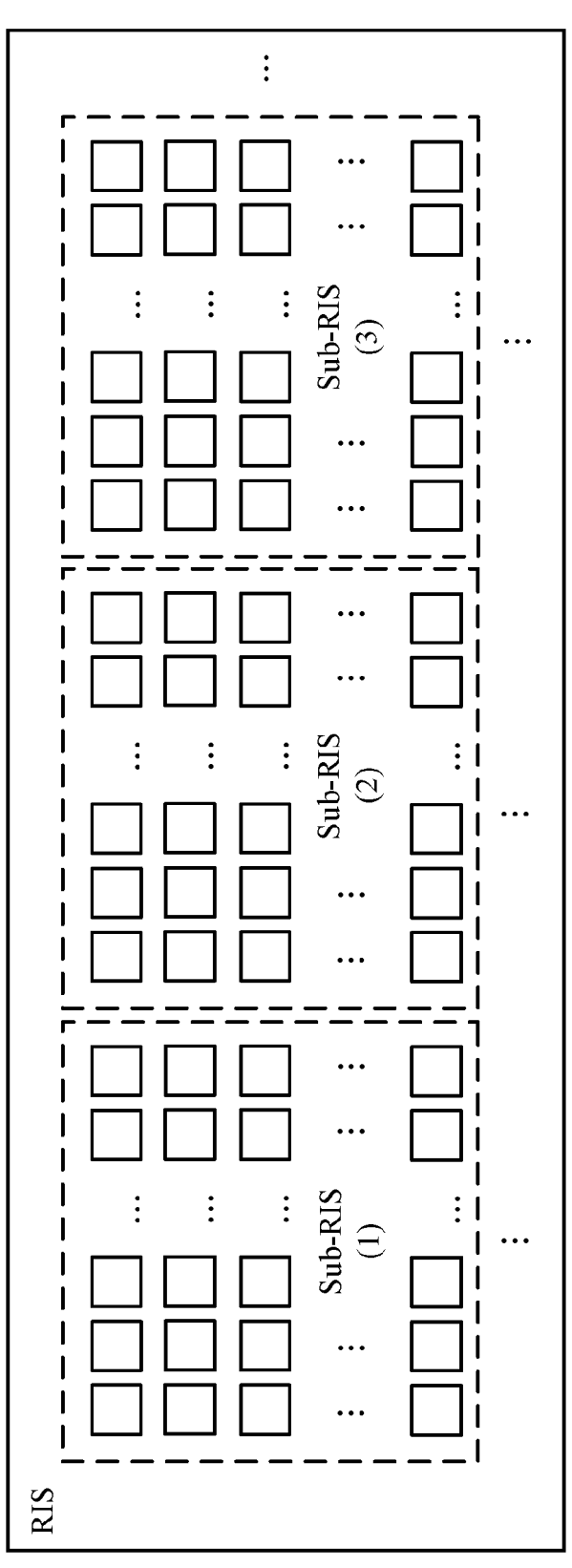
FIG. 9 illustrates an example generation of sub-RIS weights for precoding RIS elements, in accordance with certain aspects of the present disclosure.

FIG. 9 illustrates an example generation 900 of sub-RIS weights for precoding RIS elements, in accordance with certain aspects of the present disclosure. The DFT weights may be generated to only a portion of the RIS elements, and be reused or modified to be used by the remaining RIS elements. When there is a large number of RIS elements, such cluster-based DFT codebook generation may reduce the overall computation workload. For example, the RIS controller may generate, for every small cluster, subset, or part of RIS's elements, such as of a size $M_1$ by $N_1$, a DFT vector. The RIS controller may then apply the same DFT vector generated for the subset across other subsets. The RIS controller may generate varying DFT vectors for the remaining RIS elements according to a pattern, such as by shifting or scaling the DFT vector generated for the initial subset. The RIS controller may also generate different DFT vectors if needed.

As shown in FIG. 9, three subsets of the RIS are shown: sub-RIS (1), (2), and (3). The RIS controller may generate a codebook for sub-RIS (1) using previously described techniques. In some cases, the sub-RIS (2) and sub-RIS (3) may use the same codebook generated for sub-RIS (1). In some cases, a single index can be used as a starting DFT index for other clusters to have a shifted version of that index. That is, the DFT weights may be associated with a starting index for generating one or more shifted versions of the DFT weights. The one or more shifted versions of the DFT weights may be applied to other subsets of the RIS elements. For example, if index 4 is used in sub-RIS (1), then index 5 may be used in sub-RIS (2), index 6 may be used in sub-RIS (3), etc. In some cases, repetition of the same index across different sub-RISs or clusters is also possible. In aspects, the all-zero vector(s), if any generated, remains part of the codebook so that RIS controller can disable one or more of the sub-RISs.

Figure 10:
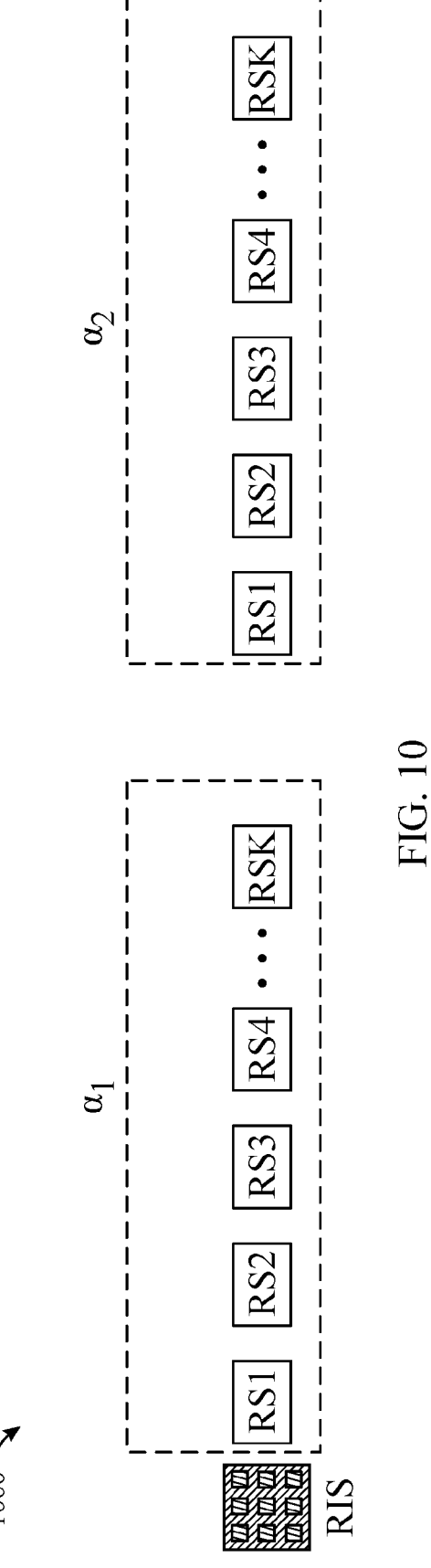
FIG. 10 illustrates an example generation of multiple sets of precoding weights for precoding RIS elements, in accordance with certain aspects of the present disclosure.

FIG. 10 illustrates an example generation 1000 of multiple sets of precoding weights for precoding RIS elements, in accordance with certain aspects of the present disclosure. As previously discussed in FIGS. 6A and 6B, the codebook generator in the RIS controller generates precoding weights to reconfigure the RIS elements. In addition and alternative to the DFT weights aforementioned, the codebook generator may also generate the weights using a fractional Fourier transform (FrFT) function, which is a generalized form. As such, the RIS controller may have improved flexibility (while under similar implementation complexity). Employing FrFT, the RIS controller may result in improved performance in certain cases such as cases associated with high Doppler effect. The re-radiation beams using FrFT precoding may be used in regular channel state information (CSI) enhancement in different communications, such as in high Doppler cases.

Similar to previous discussion of implementing DFT computations, the FrFT function is a function of any real $\alpha$ angle and expressed below:

$$F_\alpha[f](u) = \sqrt{1 - i \cot(\alpha)e^{i\pi \cot(\alpha)u^2}} \int_{-\infty}^{\infty} e^{-i2\pi\left(csc(\alpha)ux - \frac{cot(\alpha)}{2}x^2\right)} f(x)dx$$

In the FrFT function, the $\sqrt{1-i\cot(\alpha)e^{i\pi cot(\alpha)u^2}}$ component represents a chirp signal in the frequency division domain, while the $$\frac{\cot(\alpha)}{2}x^2$$

component represents a chirp signal in the time division domain. The chirp basis of the function provides good properties for avoiding timing and frequency errors. In certain situations, such as when $\alpha=\pi/2$, the FrFT function becomes the conventional Fourier transform. When $\alpha=-\pi/2$, the FrFT function becomes the inverse Fourier transform. For doubly selective channels based on both time and frequency domains, the FrFT function also presents improved performance over DFT functions.

When the FrFT function is implemented digitally, the execution is similar to that of the conventional fast Fourier transform (FFT). The FrFT function has certain beneficial characteristics, such as $F_{\alpha+\beta}=F_\alpha F_\beta$, and $F_\beta F_{-\beta}=1$. As such, the transmitted data may be decoded only when the correct angle, $\beta$, is used by the receiver. As intended, different angles, $\alpha$, may be used to change the set of beams (re-radiated off the RIS), and the $\alpha$ angles may be optimized. Such optimization can be based on Doppler effect. The optimization process of the $\alpha$ angle would be the training process (or one that is similar) of FIGS. 6A and 6B. Through the training process, the RIS controller (with the feedback from wireless communication devices) may optimize the $\alpha$ angle to obtain the best codebook for the situation to maximize the signal strength, energy efficiency, and/or robustness of the performance of the devices involved (e.g., to a specific gNB, RIS, and UE situation).

Referring to FIG. 6A, in certain aspects when the code-book generator uses the FrFT function, the first wireless communication device may signal to the RIS controller a set of $\alpha$ angles to be used for each RIS. The signaling may be performed using RRC, MAC CE, or DCI. The starting index indicating the precoding settings to be used with the first reference signal from the second wireless communication device. Alternatively, the entire sequence of beams may be used across all reference signals (i.e., each reference signal from the second wireless communication device may be re-radiated by the RIS in the entire sequence of beams). For example, as shown in FIG. 10, a first set of reference signals (from 1 through k) may be configured (when re-radiated off the RIS) using weights generated with a first angle $\alpha_1$ and a second set of reference signals (also from 1 through k) may be configured using weights generated with a second angle $\alpha_2$, and so on.

Similar to previous discussions of the DFT codebook generation examples, the codebook generated using the FrFT function may have similar implementations of computing and applying the precoding weights to the RIS elements or a subset thereof.

In aspects, two-dimension cases may be implemented by generating two dimensional FrFT matrices, each with the corresponding dimension size (M or N), and performing the Kronecker product thereon.

In aspects, each RIS or sub-RIS can be signaled (or controlled by the RIS controller with) its own parameters of the FrFT. The parameters may include the $\alpha$ angle, mapping of the weights, one or more indicators identifying a part of the codebook generated to be applied, and indication of how a sub-RIS codebook is to be populated to the rest of RIS. In some cases, each sub-RIS may have its own $\alpha$, which can be the same or different across multiple sub-RISs.

FIG. 11 illustrates a communications device 1100 that may include various components (e.g., corresponding to means-plus-function components) configured to perform operations for the techniques disclosed herein, such as the operations illustrated in FIG. 4. The communications device 1100 includes a RIS controller 1102 coupled to a RIS interface 1108, which may form a wired or wireless connection with a RIS. The transceiver 1108 is configured to transmit and receive signals for the communications device 1100 via an antenna 1110, such as the various signals as described herein, for example, for transmitting uplink transmissions with different transmission configuration. The RIS controller 1102 may be configured to perform processing functions for the communications device 1100, including processing signals received and/or to be transmitted by the communications device 1100.

The RIS controller 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 4, or other operations for performing the various techniques discussed herein for interference control for uplink transmission. In certain aspects, computer-readable medium/memory 1112 stores code 1122 for generating a codebook for performing precoding of elements of a reconfigurable intelligent surface (RIS), code 1124 for participating in training between a transmitter and a receiver, by applying different precodings to the RIS elements, based on the codebook, while the transmitter transmits reference signals (RSs), code 1126 for obtaining feedback from the receiver based on the training, and code 1128 for applying precoding to the RIS elements for communications between the transmitter and the receiver based on the feedback and the codebook. In certain aspects, the processor 1104 has circuitry configured to implement the code stored in the computer-readable medium/memory 1112. The processor 1104 includes circuitry 1132 for generating a codebook for performing precoding of elements of a RIS, circuitry 1134 for participating in training between a transmitter and a receiver, by applying different precodings to the RIS elements, based on the codebook, while the transmitter transmits RSs, circuitry 1136 for obtaining feedback from the receiver based on the training, and circuitry 1138 for applying precoding to the RIS elements for communications between the transmitter and the receiver based on the feedback and the codebook.

Figure 12:
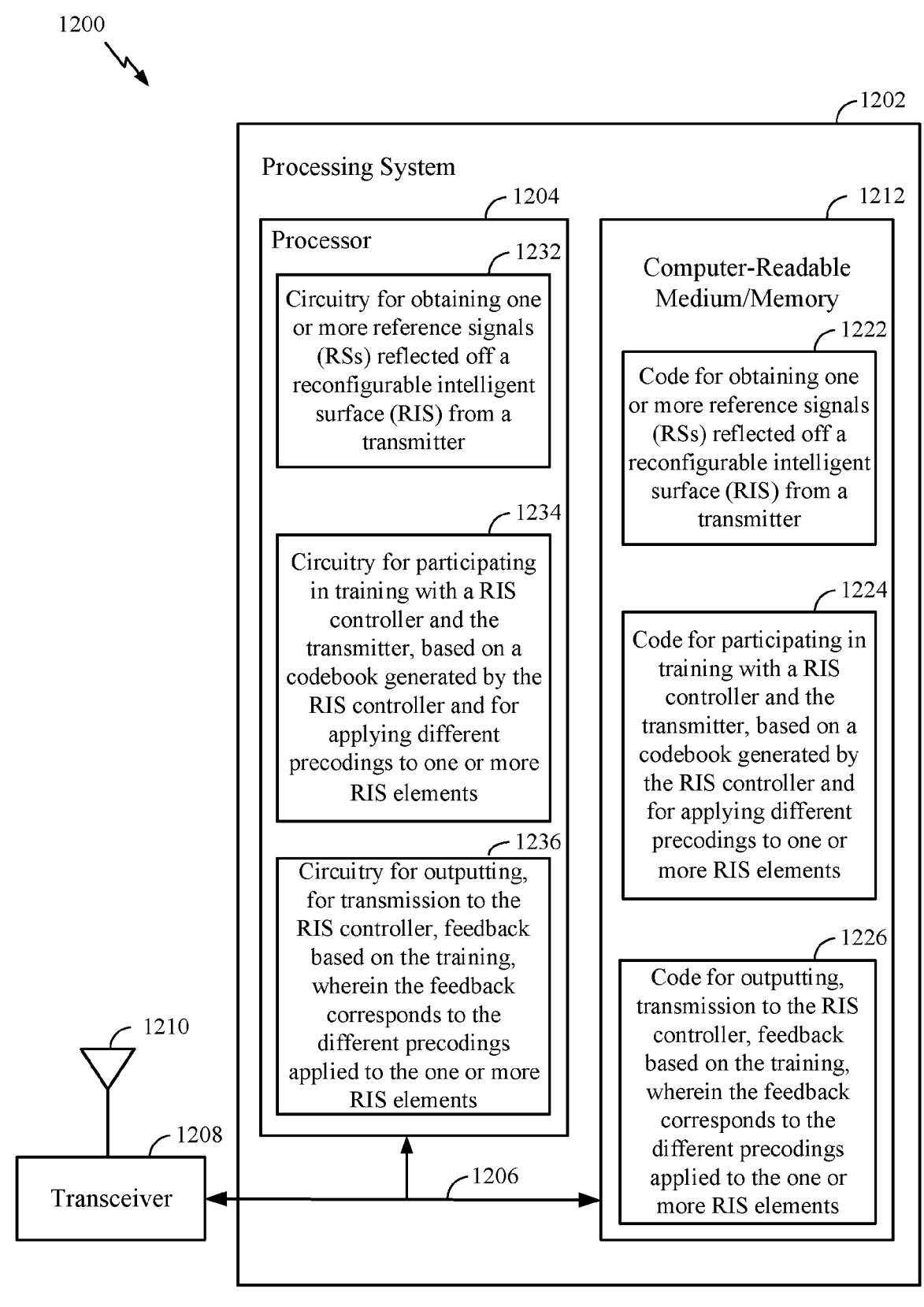
FIG. 12 illustrates a communications device that may include various components configured to perform operations for the techniques disclosed herein.

FIG. 12 illustrates a communications device 1200 that may include various components (e.g., corresponding to means-plus-function components) configured to perform operations for the techniques disclosed herein, such as the operations illustrated in FIG. 5. The communications device 1200 includes a processing system 1202 coupled to a transceiver 1208. The transceiver 1208 is configured to transmit and receive signals for the communications device 1200 via an antenna 1210, such as the various signals as described herein, for example, receiving uplink transmissions. The processing system 1202 may be configured to perform processing functions for the communications device 1200, including processing signals received and/or to be transmitted by the communications device 1200, such as interference control for uplink transmissions.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 5, or other operations for performing the various techniques discussed herein for interference control for uplink transmission. In certain aspects, computer-readable medium/memory 1212 stores code 1222 for obtaining one or more reference signals (RSs) reflected off a reconfigurable intelligent surface (RIS) from a transmitter, code 1224 for participating in training with a RIS controller and the transmitter, based on a codebook generated by the RIS controller and for applying different precodings to one or more RIS elements, and code 1226 for outputting, for transmission to the RIS controller, feedback based on the training, wherein the feedback corresponds to the different precodings applied to the one or more RIS elements. In certain aspects, the processor 1204 has circuitry configured to implement the code stored in the computer-readable medium/memory 1212. The processor 1204 includes circuitry 1232 for obtaining one or more RSs reflected off a RIS from a transmitter, circuitry 1234 for participating in training with a RIS controller and the transmitter, based on a codebook generated by the RIS controller and for applying different precodings to one or more RIS elements, and circuitry 1236 for outputting, for transmission to the RIS controller, feedback based on the training, wherein the feedback corresponds to the different precodings applied to the one or more RIS elements.

EXAMPLE ASPECTS

Aspect 1: A method for wireless communications, comprising: generating a codebook for performing precoding of elements of a reconfigurable intelligent surface (RIS); participating in training between a transmitter and a receiver, by applying different precodings to the RIS elements, based on the codebook, while the transmitter transmits reference signals (RSs); receiving feedback from the receiver based on the training; and applying precoding to the RIS elements for communications between the transmitter and the receiver based on the feedback and the codebook.

Aspect 2: The method of Aspect 1, wherein the application of different precodings to the RIS elements causes at least one of a phase shift or an amplitude change to one or more of the RIS elements when the RIS reflects the RSs.

Aspect 3: The method of any one of Aspects 1-2, wherein the feedback comprises an indication of results of the training.

Aspect 4: The method of Aspect 3, wherein the indication comprises an index corresponding to one of the RSs.

Aspect 5: The method of any one of Aspects 1-4, wherein participating in the training comprises sequentially updating the RIS elements based on at least a portion of the codebook, while the transmitter transmits the RSs to the receiver.

Aspect 6: The method of any one of Aspects 1-5, wherein the generation of the codebook comprises computing discrete Fourier transform (DFT) weights corresponding to at least a subset of the RIS elements.

Aspect 7: The method of Aspect 6, wherein the DFT weights correspond to a subset of the RIS elements.

Aspect 8: The method of Aspect 7, further comprising applying the DFT weights to other subsets of the RIS elements.

Aspect 9: The method of Aspect 7, wherein the DFT weights are associated with a starting index for generating one or more shifted versions of the DFT weights, and further comprising applying the one or more shifted versions of the DFT weights to other subsets of the RIS elements.

Aspect 10: The method of Aspect 6, wherein the codebook comprises at least one all-zero vector applicable to disable at least one subset of the RIS elements when the all-zero vector is used as the DFT weights.

Aspect 11: The method of Aspect 6, wherein computing the DFT weights comprises generating a DFT matrix of M by N weights corresponding to M by N elements of the RIS, wherein M is a number of rows of the RIS elements, and N is a number of columns of the RIS elements.

Aspect 12: The method of Aspect 6, wherein computing the DFT weights comprises at least one of: computing a Kronecker product of a first vector to be used across the RIS elements in the vertical domain and a second vector to be used across the RIS elements in the horizontal domain; generating a single DFT vector with a size of M·N from a DFT matrix of size MN by MN; or generating M DFT vectors from an N by N DFT matrix.

Aspect 13: The method of any one of Aspects 6-10, wherein computing the DFT weights comprises generating, based on an oversampling factor, a DFT matrix of oversampled DFT weights corresponding to the RIS elements for a high resolution of weights.

Aspect 14: The method of Aspect 13, further comprising receiving, from at least one of the transmitter or receiver, an indication of the oversampling factor.

Aspect 15: The method of Aspect 13, wherein computing the oversampled DFT weights further comprises: receiving signaling from at least one of the transmitter or receiver when orthogonal beams across time are used; and selecting a portion of the codebook based on the received signaling.

Aspect 16: The method of Aspect 15, wherein the portion of the codebook generated comprises an oversampled number of rows and an original number of columns reduced from an oversampled number of columns by truncation.

Aspect 17: The method of Aspect 6, wherein the computation of the DFT weights comprises generating, based on an oversampling factor, a DFT matrix of M by N weights corresponding to M by N elements of the RIS, wherein M is a number of rows of the RIS elements, and N is a number of columns of the RIS elements and the generation of the DFT matrix comprises at least one of: computing a Kronecker product of a first vector to be used across the RIS elements in the vertical domain and a second vector to be used across the RIS elements in the horizontal domain and applying the oversampling factor to each dimension of the DFT matrix of M by N weights based on the Kronecker product; generating a single DFT vector with a size of M·N from a DFT matrix of size MN by MN and applying the oversampling factor to the single DFT vector of the size of M·N; or generating, by applying the oversampling factor, M DFT vectors from an N by N DFT matrix.

Aspect 18: The method of Aspect 17, wherein the generation of the DFT matrix further comprises applying the DFT weights to the corresponding RIS elements: row by row, from left to right, or column by column, from top to bottom.

Aspect 19: The method of Aspect 6, wherein applying different precodings to the RIS elements based on the codebook comprises associating the DFT weights to corresponding RSs at a certain time within a series of times.

Aspect 20: The method of Aspect 19, wherein applying different precodings to the RIS elements further comprises signaling, to at least the receiver, an entire sequence of K indices of DFT weights corresponding to K RSs, wherein K is the total number of RSs.

Aspect 21: The method of Aspect 20, wherein applying different precodings to the RIS elements further comprises: signaling, to at least the receiver, an index of DFT weights corresponding to a first RS; and generating a series of incremental indices, based on the signaled index of DFT weights, corresponding to other RSs, wherein the incremental indices are generated using an offset value between consecutive weights corresponding to consecutive RSs.

Aspect 22: The method of any one of Aspects 1-21, wherein generating the codebook comprises computing fractional Fourier transform (FrFT) weights, corresponding to at least a subset of the RIS elements.

Aspect 23: The method of Aspect 22, wherein computing the FrFT weights comprises computing an FrFT function of an α angle, the FrFT function including a first chirp signal in a frequency division domain and a second chirp signal in a time division domain.

Aspect 24: The method of Aspect 23, wherein the α angle is varied to change the FrFT weights for generating the codebook for different beam settings.

Aspect 25: The method of Aspect 23, wherein participating in the training between the transmitter and the receiver further comprises identifying a value for the α angle based on the feedback from the receiver, wherein the identified value for the α angle maximizes one or more metrics associated with the feedback from the receiver.

Aspect 26: The method of Aspect 23, further comprising receiving, from at least one of the transmitter or receiver, at least one of: an indication of the α angle; or one or more parameters, including the α angle, to be used for configuring FrFT weights for at least a subset of the RIS elements.

Aspect 27: The method of Aspect 22, wherein the FrFT weights correspond to a subset of the RIS elements.

Aspect 28: The method of Aspect 27, further comprising applying the FrFT weights to other subsets of the RIS elements.

Aspect 29: The method of Aspect 27, wherein the FrFT weights are associated with a starting index for generating one or more shifted versions of the FrFT weights, and further comprising applying the one or more shifted versions of the FrFT weights to other subsets of the RIS elements.

Aspect 30: The method of Aspect 22, wherein the codebook comprises at least one all-zero vector applicable to disable at least one subset of the RIS elements when the all-zero vector is used as the FrFT weights.

Aspect 31: The method of Aspect 22, wherein computing the FrFT weights comprises generating a DFT matrix of M by N weights corresponding to M by N elements of the RIS, wherein M is a number of rows of the RIS elements, and N is a number of columns of the RIS elements.

Aspect 32: The method of Aspect 22, wherein computing the FrFT weights comprises at least one of: computing a Kronecker product of a first vector to be used across the RIS elements in the vertical domain and a second vector to be used across the RIS elements in the horizontal domain; generating a single DFT vector with a size of M·N from a DFT matrix of size MN by MN; or generating M DFT vectors from an N by N DFT matrix.

Aspect 33: The method of any one of Aspects 22-26, wherein computing the FrFT weights comprises generating, based on an oversampling factor, a DFT matrix of oversampled FrFT weights corresponding to the RIS elements for a high resolution of weights.

Aspect 34: The method of Aspect 33, further comprising receiving, from at least one of the transmitter or receiver, an indication of the oversampling factor.

Aspect 35: The method of Aspect 33, wherein computing the oversampled FrFT weights further comprises: receiving signaling from at least one of the transmitter or receiver when orthogonal beams across time are used; and selecting a portion of the codebook based on the received signaling.

Aspect 36: The method of Aspect 35, wherein the portion of the codebook generated comprises an oversampled number of rows and an original number of columns reduced from an oversampled number of columns by truncation.

Aspect 37: The method of Aspect 32, wherein the computation of the FrFT weights comprises generating, based on an oversampling factor, a DFT matrix of M by N weights corresponding to M by N elements of the RIS, wherein M is a number of rows of the RIS elements, and N is a number of columns of the RIS elements and the generation of the DFT matrix comprises at least one of: computing a Kronecker product of a first vector to be used across the RIS elements in the vertical domain and a second vector to be used across the RIS elements in the horizontal domain and applying the oversampling factor to each dimension of the DFT matrix of M by N weights based on the Kronecker product; generating a single DFT vector with a size of M·N from a DFT matrix of size MN by MN and applying the oversampling factor to the single DFT vector of the size of M·N; or generating, by applying the oversampling factor, M DFT vectors from an N by N DFT matrix.

Aspect 38: The method of Aspect 37, wherein the generation of the DFT matrix further comprises applying the FrFT weights to the corresponding RIS elements: row by row, from left to right, or column by column, from top to bottom.

Aspect 39: The method of Aspect 22, wherein applying different precodings to the RIS elements based on the codebook comprises associating the FrFT weights to corresponding RSs at a certain time within a series of times.

Aspect 40: The method of Aspect 39, wherein applying different precodings to the RIS elements further comprises signaling, to at least the receiver, an entire sequence of K indices of FrFT weights corresponding to K RSs, wherein K is the total number of RSs.

Aspect 41: The method of Aspect 40, wherein applying different precodings to the RIS elements further comprises: signaling, to at least the receiver, an index of FrFT weights corresponding to a first RS; and generating a series of incremental indices, based on the signaled index of FrFT weights, corresponding to other RSs, wherein the incremental indices are generated using an offset value between consecutive weights corresponding to consecutive RSs.

Aspect 42: A method for wireless communications by a receiver, comprising: receiving one or more reference signals (RSs) reflected off a reconfigurable intelligent surface (RIS) from a transmitter; participating in training with a RIS controller and the transmitter, based on a codebook generated by the RIS controller and for applying different precodings to one or more RIS elements; and transmitting, to the RIS controller, feedback based on the training, wherein the feedback corresponds to the different precodings applied to the one or more RIS elements.

Aspect 43: The method of Aspect 42, wherein the transmitter or the receiver comprise one of: a base station, a user equipment (UE) in communication with the base station, or a sidelink UE in communication with the UE.

Aspect 44: A controller, comprising: means for generating a codebook for performing precoding of elements of a reconfigurable intelligent surface (RIS); means for participating in training between a transmitter and a receiver, by applying different precodings to the RIS elements, based on the codebook, while the transmitter transmits reference signals (RSs); means for receiving feedback from the receiver based on the training; and means for applying precoding to the RIS elements for communications between the transmitter and the receiver based on the feedback and the codebook.

Aspect 45: The controller of Aspect 44, wherein the application of different precodings to the RIS elements causes at least one of a phase shift or an amplitude change to one or more of the RIS elements when the RIS reflects the RSs.

Aspect 46: The controller of any one of Aspects 44-45, wherein the feedback comprises an indication of results of the training.

Aspect 47: The controller of Aspect 46, wherein the indication comprises an index corresponding to one of the RSs.

Aspect 48: The controller of any one of Aspects 44-47, wherein the means for participating in the training comprises means for sequentially updating the RIS elements based on at least a portion of the codebook, while the transmitter transmits the RSs to the receiver.

Aspect 49: The controller of any one of Aspects 44-48, wherein the means for generating the codebook comprises means for computing discrete Fourier transform (DFT) weights corresponding to at least a subset of the RIS elements.

Aspect 50: The controller of Aspect 49, wherein the DFT weights correspond to a subset of the RIS elements.

Aspect 51: The controller of Aspect 50, further comprising means for applying the DFT weights to other subsets of the RIS elements.

Aspect 52: The controller of Aspect 50, wherein the DFT weights are associated with a starting index for generating one or more shifted versions of the DFT weights, and further comprising applying the one or more shifted versions of the DFT weights to other subsets of the RIS elements.

Aspect 53: The controller of Aspect 49, wherein the codebook comprises at least one all-zero vector applicable to disable at least one subset of the RIS elements when the all-zero vector is used as the DFT weights.

Aspect 54: The controller of Aspect 49, wherein the means for computing the DFT weights comprises means for generating a DFT matrix of M by N weights corresponding to M by N elements of the RIS, wherein M is a number of rows of the RIS elements, and N is a number of columns of the RIS elements.

Aspect 55: The controller of Aspect 49, wherein the means for computing the DFT weights comprises at least one of: means for computing a Kronecker product of a first vector to be used across the RIS elements in the vertical domain and a second vector to be used across the RIS elements in the horizontal domain;

means for generating a single DFT vector with a size of M·N from a DFT matrix of size MN by MN; or means for generating M DFT vectors from an N by N DFT matrix.

Aspect 56: The controller of any one of Aspects 49-53, wherein the means for computing the DFT weights comprises means for generating, based on an oversampling factor, a DFT matrix of oversampled DFT weights corresponding to the RIS elements for a high resolution of weights.

Aspect 57: The controller of Aspect 56, further comprising means for receiving, from at least one of the transmitter or receiver, an indication of the oversampling factor.

Aspect 58: The controller of Aspect 56, wherein the means for computing the oversampled DFT weights further comprises: means for receiving signaling from at least one of the transmitter or receiver when orthogonal beams across time are used; and means for selecting a portion of the codebook based on the received signaling.

Aspect 59: The controller of Aspect 58, wherein the portion of the codebook generated comprises an oversampled number of rows and an original number of columns reduced from an oversampled number of columns by truncation.

Aspect 60: The controller of Aspect 49, wherein the means for computing the DFT weights comprises means for generating, based on an oversampling factor, a DFT matrix of M by N weights corresponding to M by N elements of the RIS, wherein M is a number of rows of the RIS elements, and N is a number of columns of the RIS elements and the means for generating the DFT matrix comprises at least one of: means for computing a Kronecker product of a first vector to be used across the RIS elements in the vertical domain and a second vector to be used across the RIS elements in the horizontal domain and means for applying the oversampling factor to each dimension of the DFT matrix of M by N weights based on the Kronecker product; means for generating a single DFT vector with a size of M·N from a DFT matrix of size MN by MN and means for applying the oversampling factor to the single DFT vector of the size of M·N; or means for generating, by applying the oversampling factor, M DFT vectors from an N by N DFT matrix.

Aspect 61: The controller of Aspect 60, wherein the means for generating the DFT matrix further comprises means for applying the DFT weights to the corresponding RIS elements: row by row, from left to right, or column by column, from top to bottom.

Aspect 62: The controller of Aspect 49, wherein the means for applying different precodings to the RIS elements based on the codebook comprises means for associating the DFT weights to corresponding RSs at a certain time within a series of times.

Aspect 63: The controller of Aspect 62, wherein the means for applying different precodings to the RIS elements further comprises means for signaling, to at least the receiver, an entire sequence of K indices of DFT weights corresponding to K RSs, wherein K is the total number of RSs.

Aspect 64: The controller of Aspect 63, wherein the means for applying different precodings to the RIS elements further comprises: means for signaling, to at least the receiver, an index of DFT weights corresponding to a first RS; and means for generating a series of incremental indices, based on the signaled index of DFT weights, corresponding to other RSs, wherein the incremental indices are generated using an offset value between consecutive weights corresponding to consecutive RSs.

Aspect 65: The controller of any one of Aspects 44-64, wherein the means for generating the codebook comprises means for computing fractional Fourier transform (FrFT) weights, corresponding to at least a subset of the RIS elements.

Aspect 66: The controller of Aspect 65, wherein the means for computing the FrFT weights comprises means for computing an FrFT function of an $\alpha$ angle, the FrFT function including a first chirp signal in a frequency division domain and a second chirp signal in a time division domain.

Aspect 67: The controller of Aspect 66, wherein the $\alpha$ angle is varied to change the FrFT weights for generating the codebook for different beam settings.

Aspect 68: The controller of Aspect 66, wherein the means for participating in the training between the transmitter and the receiver further comprises means for identifying a value for the $\alpha$ angle based on the feedback from the receiver, wherein the identified value for the $\alpha$ angle maximizes one or more metrics associated with the feedback from the receiver.

Aspect 69: The controller of Aspect 66, further comprising means for receiving, from at least one of the transmitter or receiver, at least one of: an indication of the $\alpha$ angle; or one or more parameters, including the $\alpha$ angle, to be used for configuring FrFT weights for at least a subset of the RIS elements.

Aspect 70: The controller of Aspect 65, wherein the FrFT weights correspond to a subset of the RIS elements Aspect 71: The controller of Aspect 70, further comprising means for applying the FrFT weights to other subsets of the RIS elements.

Aspect 72: The controller of Aspect 70, wherein the FrFT weights are associated with a starting index for generating one or more shifted versions of the FrFT weights, and further comprising means for applying the one or more shifted versions of the FrFT weights to other subsets of the RIS elements.

Aspect 73: The controller of Aspect 65, wherein the codebook comprises at least one all-zero vector applicable to disable at least one subset of the RIS elements when the all-zero vector is used as the FrFT weights.

Aspect 74: The controller of Aspect 65, wherein the means for computing the FrFT weights comprises means for generating a DFT matrix of M by N weights corresponding to M by N elements of the RIS, wherein M is a number of rows of the RIS elements, and N is a number of columns of the RIS elements.

Aspect 75: The controller of Aspect 65, wherein the means for computing the FrFT weights comprises at least one of: means for computing a Kronecker product of a first vector to be used across the RIS elements in the vertical domain and a second vector to be used across the RIS elements in the horizontal domain; means for generating a single DFT vector with a size of M·N from a DFT matrix of size MN by MN; or means for generating M DFT vectors from an N by N DFT matrix.

Aspect 76: The controller of any one of Aspects 65-69, wherein the means for computing the FrFT weights comprises means for generating, based on an oversampling factor, a DFT matrix of oversampled FrFT weights corresponding to the RIS elements for a high resolution of weights.

Aspect 77: The controller of Aspect 76, further comprising means for receiving, from at least one of the transmitter or receiver, an indication of the oversampling factor.

Aspect 78: The controller of Aspect 76, wherein the means for computing the oversampled FrFT weights further comprises: means for receiving signaling from at least one of the transmitter or receiver when orthogonal beams across time are used; and means for selecting a portion of the codebook based on the received signaling.

Aspect 79: The controller of Aspect 78, wherein the portion of the codebook generated comprises an oversampled number of rows and an original number of columns reduced from an oversampled number of columns by truncation.

Aspect 80: The controller of Aspect 65, wherein the means for computing the FrFT weights comprises means for generating, based on an oversampling factor, a DFT matrix of M by N weights corresponding to M by N elements of the RIS, wherein M is a number of rows of the RIS elements, and N is a number of columns of the RIS elements and the means for generating the DFT matrix comprises at least one of: means for computing a Kronecker product of a first vector to be used across the RIS elements in the vertical domain and a second vector to be used across the RIS elements in the horizontal domain and means for applying the oversampling factor to each dimension of the DFT matrix of M by N weights based on the Kronecker product; means for generating a single DFT vector with a size of M·N from a DFT matrix of size MN by MN and means for applying the oversampling factor to the single DFT vector of the size of M·N; or means for generating, by applying the oversampling factor, M DFT vectors from an N by N DFT matrix.

Aspect 81: The controller of Aspect 80, wherein the means for generating the DFT matrix further comprises means for applying the FrFT weights to the corresponding RIS elements: row by row, from left to right; or column by column, from top to bottom.

Aspect 82: The controller of Aspect 65, wherein the means for applying different precodings to the RIS elements based on the codebook comprises means for associating the FrFT weights to corresponding RSs at a certain time within a series of times.

Aspect 83: The controller of Aspect 82, wherein the means for applying different precodings to the RIS elements further comprises means for signaling, to at least the receiver, an entire sequence of K indices of FrFT weights corresponding to K RSs, wherein K is the total number of RSs.

Aspect 84: The controller of Aspect 83, wherein the means for applying different precodings to the RIS elements further comprises: means for signaling, to at least the receiver, an index of FrFT weights corresponding to a first RS; and means for generating a series of incremental indices, based on the signaled index of FrFT weights, corresponding to other RSs, wherein the incremental indices are generated using an offset value between consecutive weights corresponding to consecutive RSs.

Aspect 85: A device, comprising: means for receiving one or more reference signals (RSs) reflected off a reconfigurable intelligent surface (RIS) from a transmitter; means for participating in training with a RIS controller and the transmitter, based on a codebook generated by the RIS controller and for applying different precodings to one or more RIS elements; and means for transmitting, to the RIS controller, feedback based on the training, wherein the feedback corresponds to the different precodings applied to the one or more RIS elements.

Aspect 86: The device of Aspect 85, wherein the transmitter or the receiver comprise one of: a base station, a user equipment (UE) in communication with the base station, or a sidelink UE in communication with the UE.

Aspect 87: A controller, comprising: a processing system configured to generate a codebook for performing precoding of elements of a reconfigurable intelligent surface (RIS), and participate in training between a transmitter and a receiver, by applying different precodings to the RIS elements, based on the codebook, while the transmitter transmits reference signals (RSs); and a receiver configured to receive feedback from the receiver based on the training, wherein the processing system is further configured to apply precoding to the RIS elements for communications between the transmitter and the receiver based on the feedback and the codebook.

Aspect 88: The controller of Aspect 87, wherein the application of different precodings to the RIS elements causes at least one of a phase shift or an amplitude change to one or more of the RIS elements when the RIS reflects the RSs.

Aspect 89: The controller of any one of Aspects 87-88, wherein the feedback comprises an indication of results of the training.

Aspect 90: The controller of Aspect 89, wherein the indication comprises an index corresponding to one of the RSs.

Aspect 91: The controller of any one of Aspects 87-90, wherein the participation in the training comprises sequentially updating the RIS elements based on at least a portion of the codebook, while the transmitter transmits the RSs to the receiver Aspect 92: The controller of any one of Aspects 87-91, wherein the generation of the codebook comprises computing discrete Fourier transform (DFT) weights corresponding to at least a subset of the RIS elements.

Aspect 93: The controller of Aspect 92, wherein the DFT weights correspond to a subset of the RIS elements.

Aspect 94: The controller of Aspect 93, wherein the processing system is further configured to apply the DFT weights to other subsets of the RIS elements.

Aspect 95: The controller of Aspect 93, wherein the DFT weights are associated with a starting index for generating one or more shifted versions of the DFT weights, and further comprising applying the one or more shifted versions of the DFT weights to other subsets of the RIS elements.

Aspect 96: The controller of Aspect 92, wherein the codebook comprises at least one all-zero vector applicable to disable at least one subset of the RIS elements when the all-zero vector is used as the DFT weights.

Aspect 97: The controller of Aspect 92, wherein the computation of the DFT weights comprises generating a DFT matrix of M by N weights corresponding to M by N elements of the RIS, wherein M is a number of rows of the RIS elements, and N is a number of columns of the RIS elements.

Aspect 98: The controller of Aspect 92, wherein the computation of the DFT weights comprises at least one of: computing a Kronecker product of a first vector to be used across the RIS elements in the vertical domain and a second vector to be used across the RIS elements in the horizontal domain; generating a single DFT vector with a size of M·N from a DFT matrix of size MN by MN; or generating M DFT vectors from an N by N DFT matrix.

Aspect 99: The controller of any one of Aspects 92-96, wherein the computation of the DFT weights comprises generating, based on an oversampling factor, a DFT matrix of oversampled DFT weights corresponding to the RIS elements for a high resolution of weights.

Aspect 100: The controller of Aspect 99, wherein the receiver is further configured to receive, from at least one of the transmitter or receiver, an indication of the oversampling factor.

Aspect 101: The controller of Aspect 99, wherein the computation of the oversampled DFT weights further comprises: receiving signaling from at least one of the transmitter or receiver when orthogonal beams across time are used; and selecting a portion of the codebook based on the received signaling.

Aspect 102: The controller of Aspect 101, wherein the portion of the codebook generated comprises an oversampled number of rows and an original number of columns reduced from an oversampled number of columns by truncation.

Aspect 103: The controller of Aspect 92, wherein the computation of the DFT weights comprises generating, based on an oversampling factor, a DFT matrix of M by N weights corresponding to M by N elements of the RIS, wherein M is a number of rows of the RIS elements, and N is a number of columns of the RIS elements and the generation of the DFT matrix comprises at least one of: computing a Kronecker product of a first vector to be used across the RIS elements in the vertical domain and a second vector to be used across the RIS elements in the horizontal domain and applying the oversampling factor to each dimension of the DFT matrix of M by N weights based on the Kronecker product; generating a single DFT vector with a size of M·N from a DFT matrix of size MN by MN and applying the oversampling factor to the single DFT vector of the size of M·N; or generating, by applying the oversampling factor, M DFT vectors from an N by N DFT matrix.

Aspect 104: The controller of Aspect 103, wherein the computation of the DFT matrix further comprises applying the DFT weights to the corresponding RIS elements: row by row, from left to right; or column by column, from top to bottom.

Aspect 105: The controller of Aspect 92, wherein the application of different precodings to the RIS elements based on the codebook comprises associating the DFT weights to corresponding RSs at a certain time within a series of times.

Aspect 106: The controller of Aspect 105, wherein the application of different precodings to the RIS elements further comprises signaling, to at least the receiver, an entire sequence of K indices of DFT weights corresponding to K RSs, wherein K is the total number of RSs.

Aspect 107: The controller of Aspect 106, wherein the application of different precodings to the RIS elements further comprises: signaling, to at least the receiver, an index of DFT weights corresponding to a first RS; and generating a series of incremental indices, based on the signaled index of DFT weights, corresponding to other RSs, wherein the incremental indices are generated using an offset value between consecutive weights corresponding to consecutive RSs.

Aspect 108: The controller of any one of Aspects 87-107, wherein the generation of the codebook comprises computing fractional Fourier transform (FrFT) weights, corresponding to at least a subset of the RIS elements.

Aspect 109: The controller of Aspect 108, wherein the computation of the FrFT weights comprises computing an FrFT function of an $\alpha$ angle, the FrFT function including a first chirp signal in a frequency division domain and a second chirp signal in a time division domain.

Aspect 110: The controller of Aspect 109, wherein the $\alpha$ angle is varied to change the FrFT weights for generating the codebook for different beam settings.

Aspect 111: The controller of Aspect 109, wherein the participation in the training between the transmitter and the receiver further comprises identifying a value for the $\alpha$ angle based on the feedback from the receiver, wherein the identified value for the $\alpha$ angle maximizes one or more metrics associated with the feedback from the receiver.

Aspect 112: The controller of Aspect 109, wherein the receiver is further configured to receive, from at least one of the transmitter or receiver, at least one of: an indication of the $\alpha$ angle; or one or more parameters, including the $\alpha$ angle, to be used for configuring FrFT weights for at least a subset of the RIS elements.

Aspect 113: The controller of Aspect 108, wherein the FrFT weights correspond to a subset of the RIS elements.

Aspect 114: The controller of Aspect 113, wherein the processing system is further configured to apply the FrFT weights to other subsets of the RIS elements.

Aspect 115: The controller of Aspect 113, wherein the FrFT weights are associated with a starting index for generating one or more shifted versions of the FrFT weights, and the processing system is further configured to apply the one or more shifted versions of the FrFT weights to other subsets of the RIS elements.

Aspect 116: The controller of Aspect 108, wherein the codebook comprises at least one all-zero vector applicable to disable at least one subset of the RIS elements when the all-zero vector is used as the FrFT weights.

Aspect 117: The controller of Aspect 108, wherein the computation of the FrFT weights comprises generating a DFT matrix of M by N weights corresponding to M by N elements of the RIS, wherein M is a number of rows of the RIS elements, and N is a number of columns of the RIS elements.

Aspect 118: The controller of Aspect 108, wherein the computation of the FrFT weights comprises at least one of: computing a Kronecker product of a first vector to be used across the RIS elements in the vertical domain and a second vector to be used across the RIS elements in the horizontal domain; generating a single DFT vector with a size of M·N from a DFT matrix of size MN by MN; or generating M DFT vectors from an N by N DFT matrix.

Aspect 119: The controller of any one of Aspects 108-112, wherein the computation of the FrFT weights comprises generating, based on an oversampling factor, a DFT matrix of oversampled FrFT weights corresponding to the RIS elements for a high resolution of weights.

Aspect 120: The controller of Aspect 119, wherein the receiver is further configured to receive, from at least one of the transmitter or receiver, an indication of the oversampling factor.

Aspect 121: The controller of Aspect 119, wherein the computation of the oversampled FrFT weights further comprises: receiving signaling from at least one of the transmitter or receiver when orthogonal beams across time are used; selecting a portion of the codebook based on the received signaling.

Aspect 122: The controller of Aspect 121, wherein the portion of the codebook generated comprises an oversampled number of rows and an original number of columns reduced from an oversampled number of columns by truncation.

Aspect 123: The controller of Aspect 108, wherein the computation of the FrFT weights comprises generating, based on an oversampling factor, a DFT matrix of M by N weights corresponding to M by N elements of the RIS, wherein M is a number of rows of the RIS elements, and N is a number of columns of the RIS elements and the generating the DFT matrix comprises at least one of: computing a Kronecker product of a first vector to be used across the RIS elements in the vertical domain and a second vector to be used across the RIS elements in the horizontal domain and applying the oversampling factor to each dimension of the DFT matrix of M by N weights based on the Kronecker product; generating a single DFT vector with a size of M·N from a DFT matrix of size MN by MN and applying the oversampling factor to the single DFT vector of the size of M·N; or generating, by applying the oversampling factor, M DFT vectors from an N by N DFT matrix.

Aspect 124: The controller of Aspect 123, wherein the generation of the DFT matrix further comprises applying the FrFT weights to the corresponding RIS elements: row by row, from left to right; or column by column, from top to bottom.

Aspect 125: The controller of Aspect 108, wherein the application of different precodings to the RIS elements based on the codebook comprises associating the FrFT weights to corresponding RSs at a certain time within a series of times.

Aspect 126: The controller of Aspect 125, wherein the application of different precodings to the RIS elements further comprises signaling, to at least the receiver, an entire sequence of K indices of FrFT weights corresponding to K RSs, wherein K is the total number of RSs.

Aspect 127: The controller of Aspect 126, wherein the application of different precodings to the RIS elements further comprises: signaling, to at least the receiver, an index of FrFT weights corresponding to a first RS; and generating a series of incremental indices, based on the signaled index of FrFT weights, corresponding to other RSs, wherein the incremental indices are generated using an offset value between consecutive weights corresponding to consecutive RSs.

Aspect 128: A device, comprising: a receiver configured to receive one or more reference signals (RSs) reflected off a reconfigurable intelligent surface (RIS) from a transmitter; a processing system configured to participate in training with a RIS controller and the transmitter, based on a codebook generated by the RIS controller and for applying different precodings to one or more RIS elements; and a transmitter configured to transmit, to the RIS controller, feedback based on the training, wherein the feedback corresponds to the different precodings applied to the one or more RIS elements.

Aspect 129: The device of Aspect 128, wherein the transmitter or the receiver comprise one of: a base station, a user equipment (UE) in communication with the base station, or a sidelink UE in communication with the UE.

Aspect 130: An apparatus for wireless communications, comprising: a processing system configured to generate a codebook for performing precoding of elements of a reconfigurable intelligent surface (RIS), and participate in training between a transmitter and a receiver, by applying different precodings to the RIS elements, based on the codebook, while the transmitter transmits reference signals (RSs); and an interface configured to obtain feedback from the receiver based on the training, wherein the processing system is further configured to apply precoding to the RIS elements for communications between the transmitter and the receiver based on the feedback and the codebook.

Aspect 131: An apparatus for wireless communications, comprising: an interface configured to obtain one or more reference signals (RSs) reflected off a reconfigurable intelligent surface (RIS) from a transmitter; and a processing system configured to participate in training with a RIS controller and the transmitter, based on a codebook generated by the RIS controller and for applying different precodings to one or more RIS elements, wherein the interface is configured to output, for transmission to the RIS controller, feedback based on the training, wherein the feedback corresponds to the different precodings applied to the one or more RIS elements.

Aspect 132: A computer-readable medium for wireless communications, comprising codes executable to: generate a codebook for performing precoding of elements of a reconfigurable intelligent surface (RIS); participate in training between a transmitter and a receiver, by applying different precodings to the RIS elements, based on the codebook, while the transmitter transmits reference signals (RSs); obtain feedback from the receiver based on the training; and apply precoding to the RIS elements for communications between the transmitter and the receiver based on the feedback and the codebook.

Aspect 133: A computer-readable medium for wireless communications by a receiver, comprising codes executable to: obtain one or more reference signals (RSs) reflected off a reconfigurable intelligent surface (RIS) from a transmitter; participate in training with a RIS controller and the transmitter, based on a codebook generated by the RIS controller and for applying different precodings to one or more RIS elements; and output, for transmission to the RIS controller, feedback based on the training, wherein the feedback corresponds to the different precodings applied to the one or more RIS elements.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120 and/or processors 220, 230, 238, and/or controller/processor 240 of the BS 110 shown in FIG. 2 may be configured to perform operations 400 of FIG. 4 and/or operations 500 of FIG. 5.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for generating, means for participating, means for applying, means for updating, e.g., sequentially updating, means for computing, means for selecting, means for associating, means for identifying and means for signaling may include a processing system, which may include one or more processors, such as processors 258, 264 and 266, and/or controller/processor 280 of the UE 120 and/or processors 220, 230, 238, and/or controller/processor 240 of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein. For example, instructions for performing the operations described herein and illustrated in FIG. 4 and FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
generating a codebook for performing precoding of elements of a reconfigurable intelligent surface (RIS);
participating in training between a transmitter and a receiver, by applying different precodings to the RIS elements, based on the codebook, while the transmitter transmits reference signals (RSS);
receiving feedback from the receiver based on the training; and
applying precoding to the RIS elements for communications between the transmitter and the receiver based on the feedback and the codebook.

2. The method of claim 1, wherein the application of different precodings to the RIS elements causes at least one of a phase shift or an amplitude change to one or more of the RIS elements when the RIS reflects the RSs.

3. The method of claim 1, wherein the feedback comprises an indication of results of the training.

4. The method of claim 3, wherein the indication comprises an index corresponding to one of the RSs.

5. The method of claim 1, wherein participating in the training comprises sequentially updating the RIS elements based on at least a portion of the codebook, while the transmitter transmits the RSs to the receiver.

6. The method of claim 1, wherein the generation of the codebook comprises computing discrete Fourier transform (DFT) weights corresponding to at least a subset of the RIS elements.

7. The method of claim 6, wherein the DFT weights correspond to a subset of the RIS elements.

8. The method of claim 7, further comprising applying the DFT weights to other subsets of the RIS elements.

9. The method of claim 7, wherein the DFT weights are associated with a starting index for generating one or more shifted versions of the DFT weights, and further comprising applying the one or more shifted versions of the DFT weights to other subsets of the RIS elements.

10. The method of claim 6, wherein the codebook comprises at least one all-zero vector applicable to disable at least one subset of the RIS elements when the all-zero vector is used as the DFT weights.

11. The method of claim 6, wherein computing the DFT weights comprises generating a DFT matrix of M by N weights corresponding to M by N elements of the RIS, wherein M is a number of rows of the RIS elements, and N is a number of columns of the RIS elements.

12. The method of claim 6, wherein computing the DFT weights comprises at least one of:
computing a Kronecker product of a first vector to be used across the RIS elements in the vertical domain and a second vector to be used across the RIS elements in the horizontal domain;
generating a single DFT vector with a size of M.N from a DFT matrix of size MN by MN; or generating M DFT vectors from an N by N DFT matrix.

13. The method of claim 6, wherein computing the DFT weights comprises generating, based on an oversampling factor, a DFT matrix of oversampled DFT weights corresponding to the RIS elements for a high resolution of weights.

14. The method of claim 13, further comprising receiving, from at least one of the transmitter or receiver, an indication of the oversampling factor.

15. The method of claim 13, wherein computing the oversampled DFT weights further comprises:
receiving signaling from at least one of the transmitter or receiver when orthogonal beams across time are used; and
selecting a portion of the codebook based on the signaling received.

16. The method of claim 15, wherein the portion of the codebook generated comprises an oversampled number of rows and an original number of columns reduced from an oversampled number of columns by truncation.

17. The method of claim 6, wherein the computation of the DFT weights comprises generating, based on an oversampling factor, a DFT matrix of M by N weights corresponding to M by N elements of the RIS, wherein M is a number of rows of the RIS elements, and N is a number of columns of the RIS elements and the generation of the DFT matrix comprises at least one of:
computing a Kronecker product of a first vector to be used across the RIS elements in the vertical domain and a second vector to be used across the RIS elements in the horizontal domain and applying the oversampling factor to each dimension of the DFT matrix of M by N weights based on the Kronecker product;
generating a single DFT vector with a size of M.N from a DFT matrix of size MN by MN and applying the oversampling factor to the single DFT vector of the size of M·N; or generating, by applying the oversampling factor, M DFT vectors from an N by N DFT matrix.

18. The method of claim 17, wherein the generation of the DFT matrix further comprises applying the DFT weights to the corresponding RIS elements:
row by row, from left to right; or
column by column, from top to bottom.

19. The method of claim 6, wherein applying different precodings to the RIS elements based on the codebook comprises associating the DFT weights to corresponding RSs at a certain time within a series of times.

20. The method of claim 19, wherein applying different precodings to the RIS elements further comprises signaling, to at least the receiver, an entire sequence of K indices of DFT weights corresponding to K RSs, wherein K is the total number of RSs.

21. The method of claim 20, wherein applying different precodings to the RIS elements further comprises:

signaling, to at least the receiver, an index of DFT weights corresponding to a first RS; and generating a series of incremental indices, based on the signaled index of DFT weights, corresponding to other RSs, wherein the incremental indices are generated using an offset value between consecutive weights corresponding to consecutive RSs.

22. The method of claim 1, wherein generating the codebook comprises computing fractional Fourier transform (FrFT) weights, corresponding to at least a subset of the RIS elements.

23. The method of claim 22, wherein computing the FrFT weights comprises computing an FrFT function of an $\alpha$ angle, the FrFT function including a first chirp signal in a frequency division domain and a second chirp signal in a time division domain.

24. The method of claim 23, wherein the $\alpha$ angle is varied to change the FrFT weights for generating the codebook for different beam settings.

25. The method of claim 23, wherein participating in the training between the transmitter and the receiver further comprises identifying a value for the $\alpha$ angle based on the feedback from the receiver, wherein the identified value for the $\alpha$ angle maximizes one or more metrics associated with the feedback from the receiver.

26. The method of claim 23, further comprising receiving, from at least one of the transmitter or receiver, at least one of:

an indication of the $\alpha$ angle; or one or more parameters, including the $\alpha$ angle, to be used for configuring FrFT weights for at least a subset of the RIS elements.

27. A method for wireless communications by a device, comprising:

receiving one or more reference signals (RSs) reflected off a reconfigurable intelligent surface (RIS) from a transmitter;

participating in training with a RIS controller and the transmitter, based on a codebook generated by the RIS controller and for applying different precodings to one or more RIS elements; and transmitting, to the RIS controller, feedback based on the training, wherein the feedback corresponds to the different precodings applied to the one or more RIS elements.

28. The method of claim 27, wherein the transmitter or the receiver comprise one of: a base station, a user equipment (UE) in communication with the base station, or a sidelink UE in communication with the UE.

\* \* \* \* \*